(12) United States Patent
Yotsukura

(10) Patent No.: US 6,629,122 B1
(45) Date of Patent: Sep. 30, 2003

(54) INFORMATION PROCESSING SYSTEM AND METHOD FOR COMMUNICATIONS BETWEEN APPLICATION SYSTEMS

(75) Inventor: Mikio Yotsukura, Tokyo (JP)

(73) Assignee: Class Technology Co., Ltd., Tokyo (JP)

( * ) Notice: Subject to any disclaimer, the term of this patent is extended or adjusted under 35 U.S.C. 154(b) by 0 days.

(21) Appl. No.: 09/330,146

(22) Filed: Jun. 11, 1999

(30) Foreign Application Priority Data

Jun. 26, 1998 (JP) .......................................... P10-180816

(51) Int. Cl.$^7$ ................................................. G06F 9/00
(52) U.S. Cl. ........................................ 709/101; 709/315
(58) Field of Search ................................. 709/101, 315

(56) References Cited

U.S. PATENT DOCUMENTS 5,257,371 A * 10/1993 Anezaki ................. 707/103 R

OTHER PUBLICATIONS

Yamagishi, Nov. 21, 1987, JPO& Japio, JP62294705, 1.*
Erich Gamma, Design Patterns, 1995, Addison–Wesley, p. 1 of 9 to p. 9 of 9.*

* cited by examiner

Primary Examiner—Sue Lao
Assistant Examiner—LeChi Truong
(74) Attorney, Agent, or Firm—Foley & Lardner

(57) ABSTRACT

An information processing system comprises a batch control class for passing a beginning message, and scheduling after receiving a completion message an input class for inputting data based on conditions when receiving the beginning message from the batch control class and passing the completion message to the batch control class upon completion of input processing, a conversion class for converting the input data based on conditions upon receiving the beginning message from the batch control class, and passing the completion message to the batch control class upon completion of conversion processing, and an output class for outputting data based on conditions upon receiving the beginning message from the batch control class.

11 Claims, 35 Drawing Sheets

FIG.8

PARTIAL REPLACE

INPUT FILE [SEARCH] [____] OUTPUT FILE [SEARCH] [____]
INPUT IMAGE [____] [◀▶] OUTPUT IMAGE [____]
REPLACE NAME [____]

INPUT FILE BEGINNING COLUMN [____] NUMBER OF DIGIT [◀▶]

REPLACE INFORMATION

● CODE REPLACEMENT      FILE NAME [SEARCH] [____]

☑ MEMORY EXPANSION    KEY     BEGINNING COLUMN [◀▶] NUMBER OF DIGIT [◀▶]
                 CONVERSION   BEGINNING COLUMN [◀▶] NUMBER OF DIGIT [◀▶]

DB    [▶] [LOG IN]
              TABLE [▶]
              ROW
              KEY        BEGINNING COLUMN [▶] NUMBER OF DIGIT [◀▶]
              CONVERSION BEGINNING COLUMN [▶] NUMBER OF DIGIT [◀▶]
              CONDITION  [____]

○ CODE SEPARATION   SEPARATION CHARACTER  [____] (SEPARATE IN COMMA)
                    NUMBER OF ELEMENT

○ CODE COMBINATION  CONDITION CHARACTER

INFORMATION                    [DELETE]
[ADD]  | CODE REPLACEMENT | 15-3/12-4 | ◀ |
       |                  |           |   |
       |                  |           | ▶ |
                                              [←→] [EDIT]

[OK]  [CANCEL]

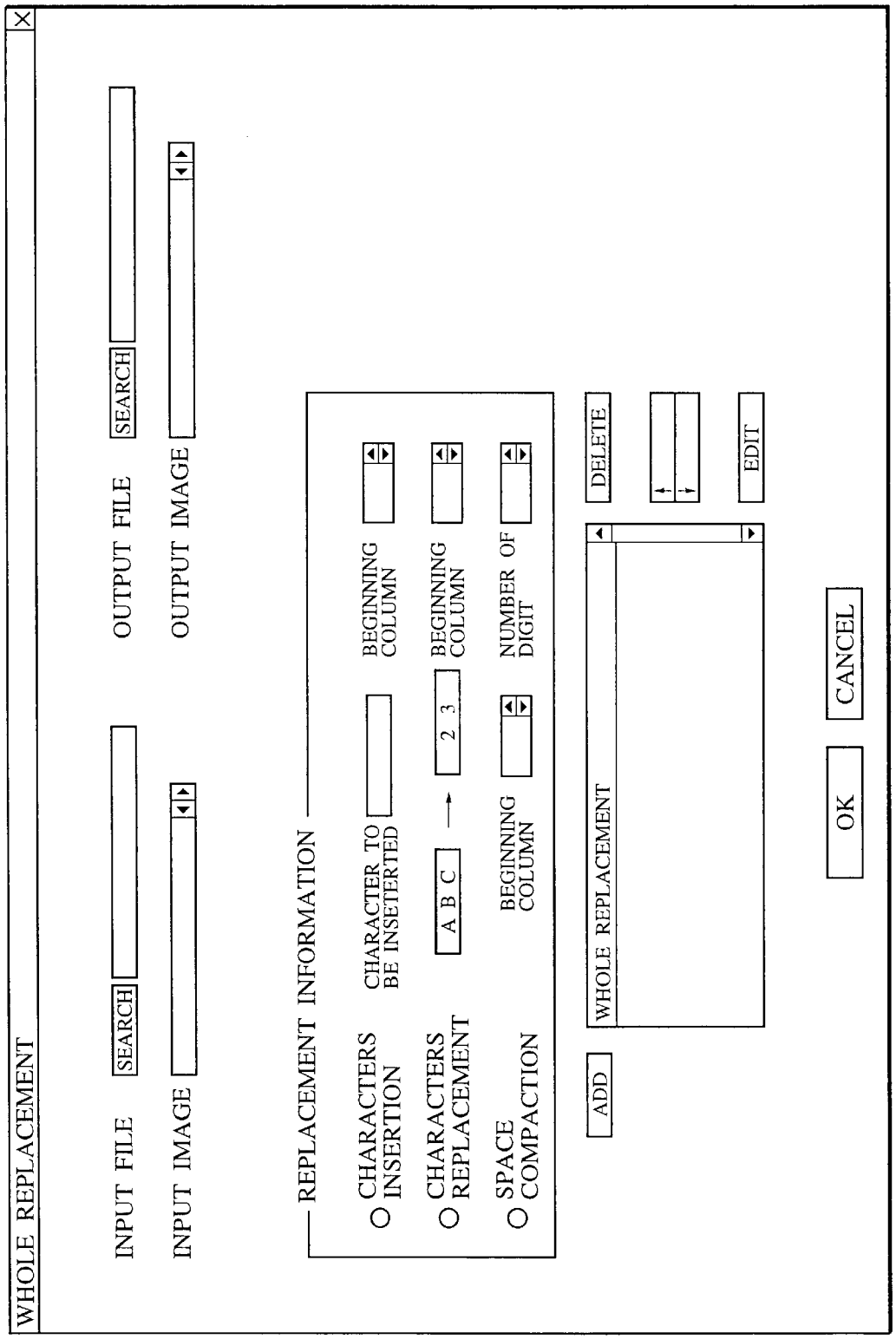

FIG.11

TOTAL CALCULATION

INPUT DATA: 12345678910

ITEM: BEGINNING COLUMN [ ]  NUMBER OF DIGIT [ ]

DATA ITEM: [DATA] [ADD]  BREAK KEY  BEGINNING COLUMN [8]  NUMBER OF DIGIT [10]

DATA ITEM:
- DATA 1
- DATA 2
- DATA 3

FUNCTION METHOD:
- Averade
- Count
- Sum
- Max
- Min
- Round

OPERATOR: [+] [−] [×] [÷] [=]

CALCULATION PAD:
7 8 9
4 5 6
1 2 3
0 .

CALCULATION FORMULA: SUM(DATA)/COUNT*2

☑ OUTPUT COLUMN  BEGINNING COLUMN [ ]  NUMBER OF DIGIT [ ]

☐ ADD TO NEXT COLUMN

[OK] [CANCEL]

FIG.12A

```
CONDITION REPLACEMENT                                    ×
    KEY 1  BEGINNING  [    ]   NUMBER OF  [    ]
           COLUMN               DIGIT
    KEY 2  BEGINNING  [    ]   NUMBER OF  [    ]
           COLUMN               DIGIT

● KEY 1 = KEY 2    ● KEY 1 ≧ KEY 2
        ● KEY 1 > KEY 2    ● KEY 1 ≦ KEY 2
        ● KEY 1 < KEY 2

PROCESS RELATIVE NUMBER  [ 2 ▼]
    INPUT   BEGINNING  [    ]   NUMBER OF  [    ]
    ITEM    COLUMN               DIGIT
    OUTPUT  BEGINNING  [    ]   NUMBER OF  [    ]
    ITEM    COLUMN               DIGIT
    CALLING METHOD  [A METHOD     ▼]

INPUT FILE IMAGE 1   [ABC    ]
    INPUT FILE IMAGE 2   [ADE    ]
    OUTPUT FILE IMAGE    [ABCDE  ]

[  OK  ]   [ CANCEL ]
```

FIG.12B

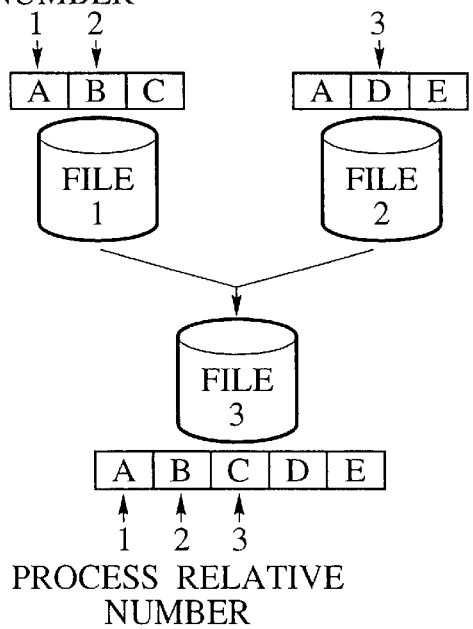

FIG.13

CHECK PROCESSING

INPUT DATA [ABCDEF]

ITEM  BEGINNING COLUMN [ ]  NUMBER OF DIGIT [ ]

OUTPUT  ⦿ MESSAGE DIALOG   ○ CERTIFICATE [SEARCH]
        ○ TEXT  [SEARCH]

☐ SELECT CHECKMETHOD  [A CHECK ▼]
☐ FORMAT CHECK

```
VY/MM/DD
MM/YY
#0
#,##00
¥,##00
CAPITAL
LOWER CASE
PERCENTEGE
```

[OK]  [CANCEL]

FIG.16

```
┌─────────────────────────────────────────────────────┐
│ SERVICE                                          ×  │
├─────────────────────────────────────────────────────┤
│  SYSTEM CONTROL LOG                                 │
│     CONVERSION  ┌─┬────────────┐▲                   │
│                 │1│SORT        │                    │
│                 │2│REPLACEMENT │                    │
│                 │ │            │▼                   │
│                 └─┴────────────┘                    │
│                                                     │
│     ☐ START/END MESSAGE                             │
│                                      ┌────────┐▲    │
│        FILE   [         ]▲  [>]      │FILE A  │     │
│                                      │FILE B  │     │
│                                      │        │▼    │
│                                      └────────┘     │
│          ☐ ACCESS                                   │
│          ☐ WARNING                                  │
│          ☐ SKIPPED                                  │
│          ☐ INSERTION                                │
│          ☐ DELETION                                 │
│          ☐ UPDATE                                   │
│          ☐ EXTRACTION   OUTPUT EVERY                │
│          ☐ STATUS MASSAGE [        ]⇕ MESSAGES      │
│                                                     │
│  OUTPUT                                             │
│      ○ FILE  [SEARCH] [          ]                  │
│      ○ DB    DB NAME [      ]▼   [LOGIN]            │
│              TABLE   [      ]▼                      │
│                                                     │
│                  [  OK  ]  [CANCEL]                 │
└─────────────────────────────────────────────────────┘
```

FIG.21A

RECEIVE PUSH-BUTTON CUSTOMISE

MAIL BOX FOLDER:
C:¥ctmail¥mailbox    SEARCH

ACCOUNT PROPERTIES | RECEIVING PREFERENCE

COMPLETE    CANCEL

FIG.21B

REPLY PUSH-BUTTON CUSTOMISE

MAIL BOX FOLDER:
C:¥ctmail¥mailbox    SEARCH

MAIL INDEX DISPLAY TABLE:
tbl1

☑ SHOW REPLY MAIL
FORM: frm2
TO: dfa
CC: dfb
SUBJECT: dfd
BODY: mlc

COMPLETE    CANCEL

FIG.21C

REPLY MAIL

☑ QUOTE ORIGINAL MESSAGE WHEN REPLYING
QUOTE MARK  >
☑ MAILING LIST
ctl@class.co.jp
mail@class.co.jp

SELECT ALL | CLEAR ALL

OK    CANCEL

FIG.23A

MAIL INDEX DISPLAY TABLE WINDOW

MAIL BOX FOLDER:
C:¥ctmail¥mailbox    [SEARCH]

— OBJECT NAME —
FORM: frmtast
FROM: df6
TO: df1
CC: df2
SUBJECT: df5
BODY: ml1
ATTACH-MENTS: df4    STATUS: df7

APPEARANCE PREFERENCES

[COMPLETE]   [CANCEL]

FIG.23B

MAIL INDEX

| SUBJECT | FROM | | UNRE |
|---|---|---|---|
| ORDER REQUEST | order@a.co.jp | 98/04/01 | ○ |
| ORDER REQUEST | order@a.co.jp | 98/05/01 | ○ |
| ORDER REQUEST | order@a.co.jp | 98/06/01 | ○ |

[MARK AS READ]   [MARK AS UNREAD]

FIG.23C

MARK AS READ/UNREAD PUSH-BUTTON CUSTOMIZE

MAIL BOX FOLDER:
C:¥ctmail¥mailbox    [SEARCH]

MAIL INDEX DISPLAY TABLE NAME:
tbl1

[COMPLETE]   [CANCEL]

FIG.32A

| PURCHASE ORDER | | | | ✕ |
|---|---|---|---|---|
| TO: | B ▼ | | | NEW |
| DELIVERY DATE | '98/06/01 ▼ | | | RETRIEVE |

| NO | ARTICLE | Q'TY | PRICE |
|---|---|---|---|
| 01 | A | 1 | 100 |
| 02 | B | 2 | 2000 |
| 03 | C | 3 | 6000 |

PRINT

PLACE ORDER

FIG.32B

CONFIRMATION OF SENDING ✕

DO YOU REALLY SEND THE MAIL BELOW

| TO: | receive@b.co.jp |
|---|---|
| CC: | order@a.co.jp |
| BCC: | |
| SUBJECT: | PURCHASE ORDER |
| BODY: | DEAR SIR:<br>FROM A COMPANY<br>DELIVERY DATE    98/06/01<br>―――――――――――<br>A COMPANY<br>                    TAKAHASHI |
| ATTACH-MENTS: | C:¥CTMail¥order.CSV |

| SEND WITH ENCRYPTION | SEND | CANCEL |

FIG.33

| RECEIVING ORDER | | | ☒ |
|---|---|---|---|

FROM [A] [DECRYPTION] [RECEIVE]

DELIVERY DATE ['98/06/01] ORDERDATE 98/05/01

| NO | ARTICLE | Q'TY | PRICE |
|---|---|---|---|
| 01 | A | 1 | 100 |
| 02 | B | 2 | 2000 |
| 03 | C | 3 | 6000 |

[REGISTER] [REPLY]

INFORMATION PROCESSING SYSTEM AND METHOD FOR COMMUNICATIONS BETWEEN APPLICATION SYSTEMS

BACKGROUND OF THE INVENTION

1. Field of the Invention

The present invention relates to an information processing system and a method for communications between application systems.

2. Description of Related Art

In related art, information processing with computer systems is described and specified with C or COBOL language. However, in the related art, a programmer needs to modify the program in case an input file or a procedure is changed. In addition, the modification of related programs is required.

On the other hand, suppose information processing occurs through the network such as WAN (Wide Area Network) or the Internet. FIG. 1 shows the communication method between application programs in the related art. In FIG. 1, a computer system 405, which executes an application A, and a computer system 407, which executes an application B, are connected with network 409, and they can communicate with each other by using the network 409. In this case, the EDI (Electric Data Interchange), like CALS (Commerce At Light Speed), JCA (Japanese Chain-store Association procedure), or the distributed object technology, like DCOM, CORBA can be used.

In the relatedt, information transmissions between application systems are often used among companies with different servers, languages, and protocols. Accordingly, proprietary communications means is needed for different communication partners, which results in a lack of flexibility. Thus, it is difficult to incorporate the communications means into an application program.

SUMMARY OF THE INVENTION

An object of the present invention is to provide an information processing system and method for communications between application systems that is capable of modifying the procedure easily, and furthermore, without preparing a program.

The present inventor has found out that the programming time can be reduced by employing a software program as a component and combining with them using the class in the object-oriented technology.

According to this invention, an information processing system is provided, which comprises a batch control class for passing a beginning message, and scheduling after receiving a completion message; an input class for inputting data based on conditions when receiving the beginning message from the batch control class and passing the completion message to the batch control class upon completion of input processing; a conversion class for converting the input data based on conditions upon receiving the beginning message from the batch control class, and passing the completion message to the batch control class upon completion of conversion processing; and an output class for outputting data based on conditions upon receiving the beginning message from the batch control class.

Another object of the present invention is to provide a flexible way of communications between application systems in above cases.

The inventor considered how communications are realized more easily. So the inventor found out that the communications between application systems could be realized by using the Internet mail, as a means for transmitting data and process. And, since the account of the Internet mail is used as an application interface, communications between application systems can be realized with through network topology. Accordingly, method for communications between application systems can be realized with flexibly even in the various companies, servers, languages, and protocols.

According to this invention, an information processing system is provided, which comprises a mail interface unit for receiving a mail as a mail format for an Internet; a receiving unit for changing the mail into receiving data which is executable for an application unit; and the application unit for executing an application using the receiving data.

BRIEF DESCRIPTION OF THE DRAWINGS

The objects, features and advantages of the present invention will become more apparent from the following description of a preferred embodiment in conjunction with the accompanying drawings, in which:

FIG. 8 is a sample window to define a partial replacement;

FIG. 9 is a sample window to define a whole replacement;

FIG. 11 is a sample window to define total calculation processing;

FIG. 12A is a sample window to define a matching processing;

FIG. 12B is a view useful in explaining an example of matching processing;

FIG. 13 is a sample window to define a check processing;

FIG. 16 is a sample window to define a system control log;

FIG. 21A is a sample window to define receive push button to generate an object;

FIG. 21B is a sample window to define reply push button to generate an object;

FIG. 21C is an example dialog for replying mail;

FIG. 23A is a sample window to define mail index display table to generate an object;

FIG. 23B is a mail index display table generated by the a confirmation dialog window generated by the send push button of FIG. 20A;

FIG. 23C is a sample window to define mail index display table to generate an object;

FIG. 32A is a purchase order window according to a first example;

FIG. 32B is a dialog of confirmation of sending according to a first example;

FIG. 33 is a receiving order window according to a first example;

DETAILED DESCRIPTION OF THE EMBODIMENTS

Figure 1:
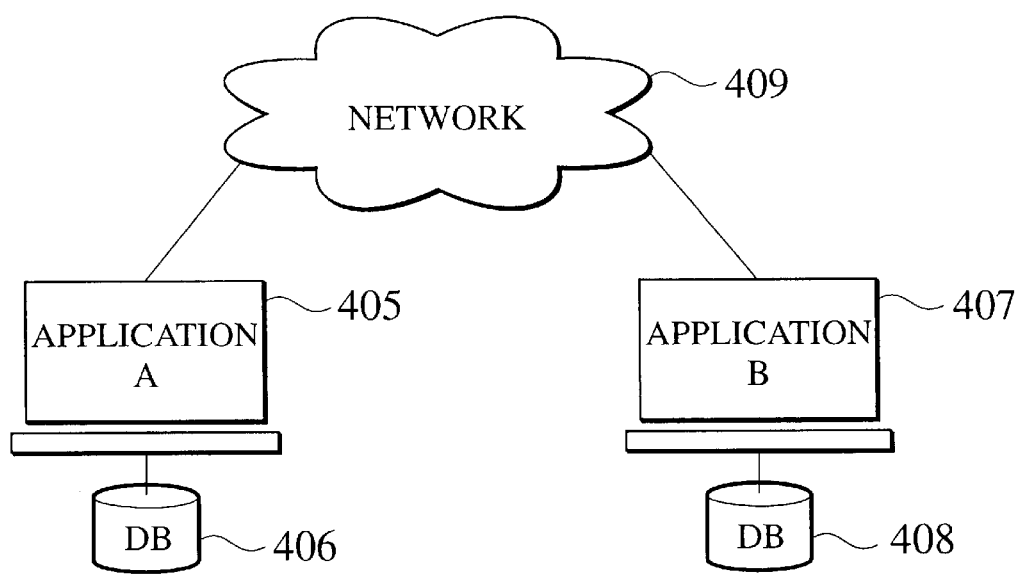
FIG. 1 is a view showing method for communications between application programs according to a related art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

OBJECT ORIENTED MODEL

Each class subjected to object oriented data model has elements including member and method. The class has at least one member. Each class determines its behavior with at least one parameter. The parameter is often used as an instance (instance value), the parameter is incorporated into a program to determine the behavior of the program. Accordingly, the term "parameters" includes an instance (instance value) to determine behavior of a program. The term "method" is a procedure executed by each class. The term "passing" includes sending and receiving messages between the classes, and term "passing" is defined by a method. The message includes request for operations and confirmation regarding operation result.

INFORMATION PROCESSING SYSTEM

To provide the information processing system of the present embodiment, software that realizes the processing as described below is written, and a computer system is used for enabling implementation of the processing. The term "computer system" may include a main frame computer, workstation, PC, or the like. The hardware configuration of the computer system used in the present embodiment includes a CPU that performs various operations, an input device, such as a keyboard, mouse, light-pen, or a flexible disk device, an output device, such as a display or a printer, or other devices. The CPU includes an operating unit that processes commands associated with the processing of each scheduling unit as explained later, and a main storage unit that stores the commands generated during the processing. The operating unit sequentially reads commands stored in the main memory unit, or external storage device, and executes the commands so as to perform processing for production and inventory control.

Figure 2:
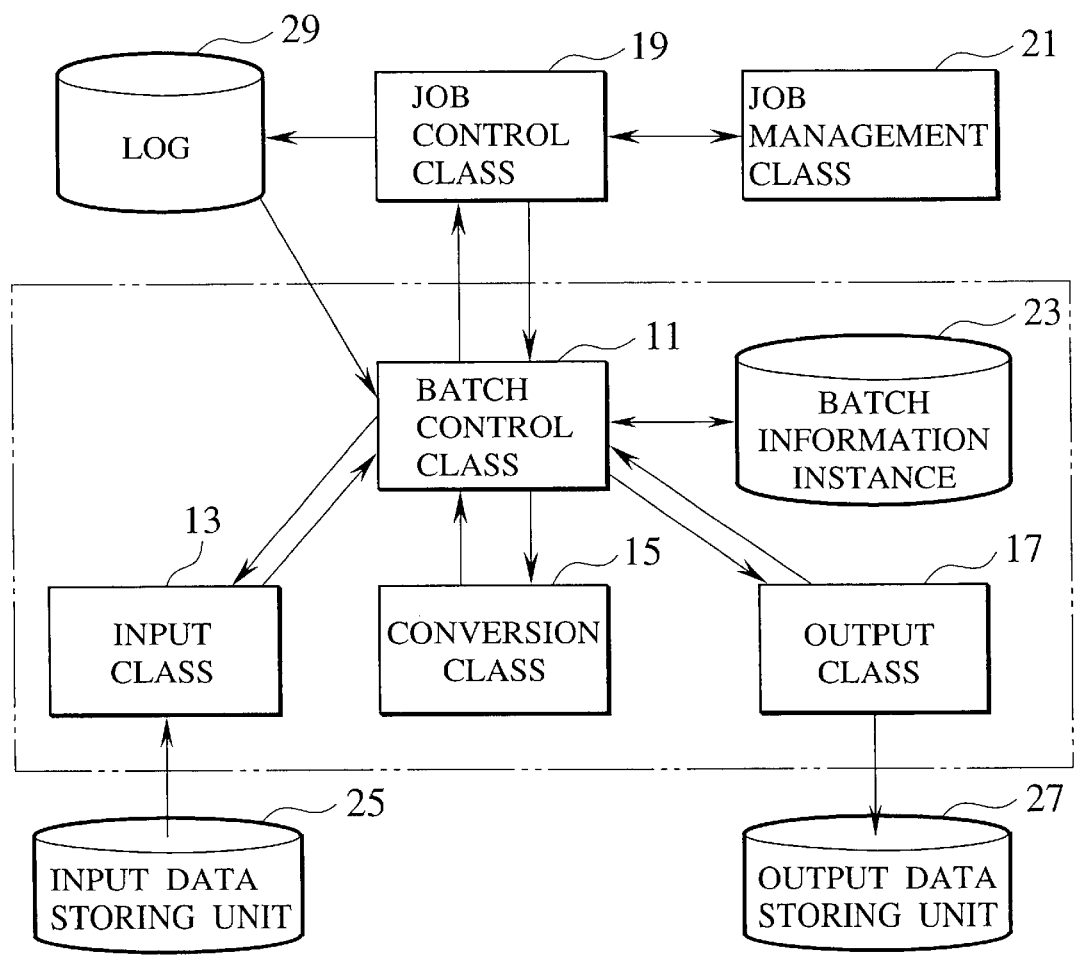
FIG. 2 is a block diagram showing information processing system according to an embodiment of the present invention.

FIG. 2 is a block diagram showing an information processing system according to an embodiment of the present invention. The system according to this embodiment comprises a batch control class 11 for passing a beginning message, and scheduling the next class according to a completion message from a class, an input class 13 for inputting data based on at least one parameter upon receiving a beginning message from the batch control class 11, a conversion class 15 for converting the input data based on at least one parameter upon receiving a beginning message from the batch control class 11, and outputting a completion message to the batch control class 11 upon completion of conversion processing, and an output class 17 for outputting data based on at least one parameter upon receiving a beginning message from the batch control class 11.

The batch control class 11 controls the input class 13, conversion class 15, and output class 17. The control of the batch class 11 sends a beginning message to each class based on at least one parameter (typically, instance value), receives a completion message (typically event) from each class, and schedules the next class. The schedule of the class is carried out in the order of the input class 13, the conversion class 15, and the output class 17. Hence, the batch control class 11 sends a beginning message to the input class 13. Next, the batch control class 11 sends a beginning message to the conversion class 15 after receiving the completion message from the input class 13. Then, the batch control class 11 sends a beginning message to the output class 17 after receiving the completion message from the conversion class 17.

The parameters of scheduling are determined when generating the batch program which describes processing. The batch program is generated and program source code stored by a class library is prepared, and the parameters are incorporated into the program source code. Also, the parameters of scheduling are stored at the batch information instance unit 23, the batch control class can refer as needed to the batch information instance unit 23.

The input class 13 is a class which receives a beginning message from the batch control class 11, then receives data from the input data stored in unit 25 based on at least one parameter indicating an input procedure. And the input class 13, prepares an input file and outputs a completion message to the batch control class 11 upon completion of the input procedure. The input procedure includes preparing an input process index file, or a reference index file, checking the format of input file, and matching or sorting of the files.

The conversion class 15 is a class which receives a beginning message from the batch control class 11, and then converts the input data based on at least one parameter indicating a conversion procedure. The conversion class 15 outputs a completion message to the batch control class 11 upon completion of the conversion procedure.

The conversion class 15 is activated when it receives the beginning message. Next, the conversion class 15 converts data based on parameters. The process results or status including such as interruption, abortion, or normally completion, are sent to the batch control class 11. Next, the conversion class 15 outputs a completion message to the batch control class 11.

Here, the principal methods include conversion methods, check methods, and service methods. Each method is executed on the data once or several times. After processing, the data is output as a conversion-work. Here, the term "conversion work" means temporary file for storing the processing data temporarily.

The output class 17 is a class which outputs the conversion-work processed by the conversion class 15 to an output unit at an output form based on at least one parameter. The output class 17 receives a beginning message from the batch control class 11, then inputs the conversion-work based on at least one parameter indicating an output procedure. And the output class 17 outputs the output data and completion message to the batch control class 11 upon completion of the output procedure. The output form includes text file, CSV file, import form file, DB file, or certification output. The output data are stored by way of an output data storing unit 27, or are printed, or both.

A job control class 19 receives a status message outputted by the conversion class 15, and then the job control class 19 outputs the status message to the log storing unit 29, or the job control class 19 outputs the status, such as a number of processing, to the job management class 21.

The job management class 21 is a class which receives the status outputted by the job control class 19 in order to manage jobs.

Figure 3:
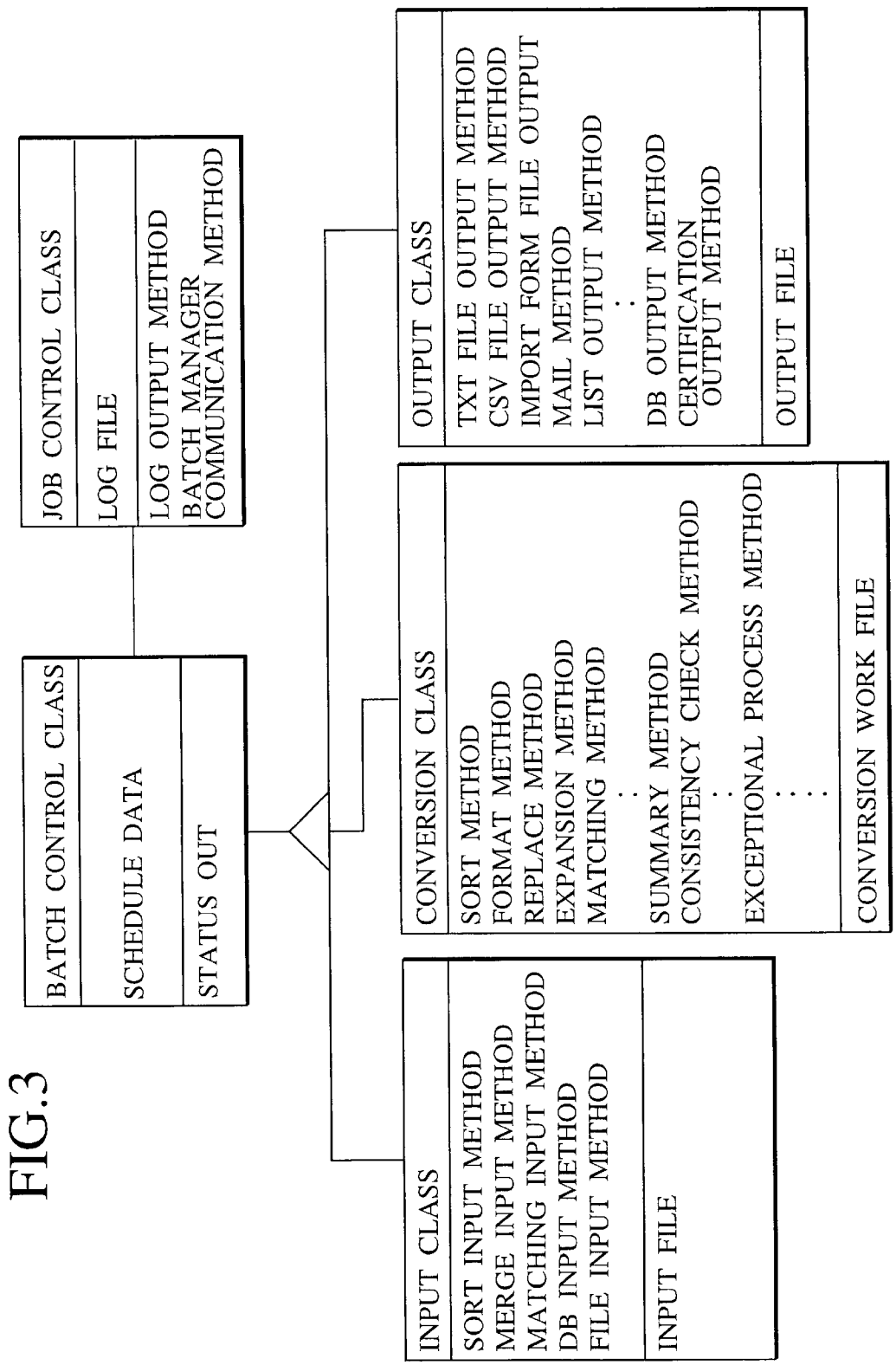
FIG. 3 shows an example of class diagram according to an embodiment.

FIG. 3 shows an example of a class diagram according to an embodiment. Here, schedule data of the batch control class define a procedure of each class. The procedures are determined by at least one parameter.

The methods of the input class include a sort input method for inputting a file with sorting, a merge input method for inputting files with merging, a matching input method for inputting files with matching, a DB input method for inputting from a database, and a file input method for inputting from a file.

The methods of the conversion class include a sort method for sorting data in a file, a format method for converting a format of data in a file, a replace method for replacing data in a file, an expansion method for expanding data in a file, a matching method for matching data in files, a summary method for summarize data in a file, a consistency check method for checking whether data in a file have consistency or not, and an exceptional process method. The methods may output processed data as a conversion-work.

The methods of the output class include a text method for outputting the file as a text file, a CSV file output method for outputting the file as a CSV file, an import form file output method for outputting the file as an import form file, a mail method for sending the file to at least one email account, a list output method for outputting the file as a list form, a DB output method for outputting the file to a database, and a certification output method for outputting the file to outputting the file as a certification form.

Figure 4:
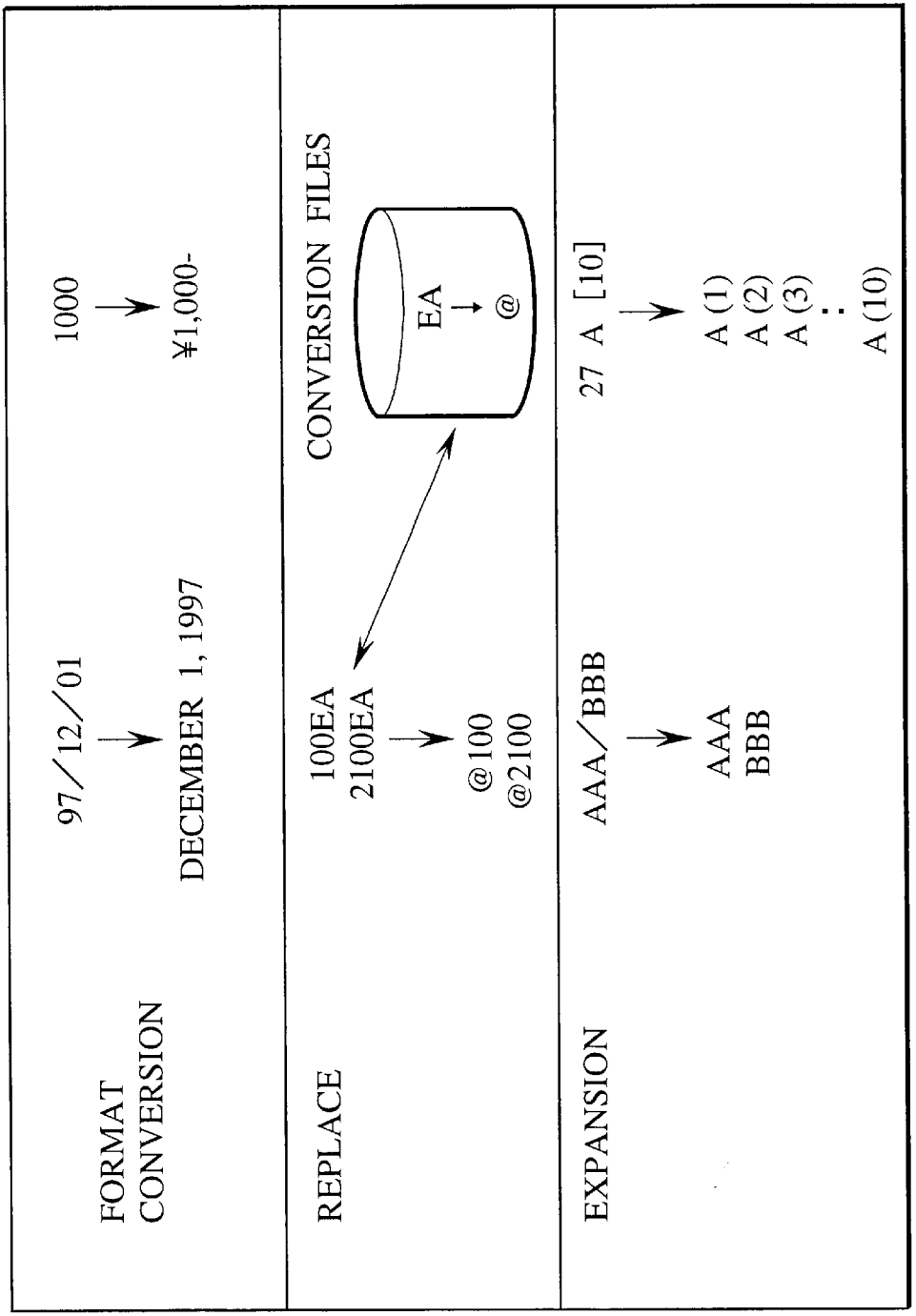
FIG. 4 is a view illustrating a conversion process of a conversion class.

FIG. 4 is a view illustrating a conversion process of a conversion class. First, the format method performs format conversion of data in a file. For example, data in a file described in form "97/12/01" is converted to "Dec. 1, 1997". Another example, data in a file described in form "1000" is converted to "¥1,000-".

Next, the replace method performs data replacement in a file. For example, data in a file described in form "100EA" is replaced to "E100".

And, the expansion method performs data expanding in a file. For example, data in a file divided by the slash (/) like "product name/part name" is expanded to each product name and part name, like "AAA" "BBB". Another example, a matrix data in a file like "A[10]" will be expanded to each element of the matrix like "A(1), A(2), . . . ,A(10)".

INFORMATION PROCESSING SYSTEM FOR PREPARING PROGRAMS

Figure 5:
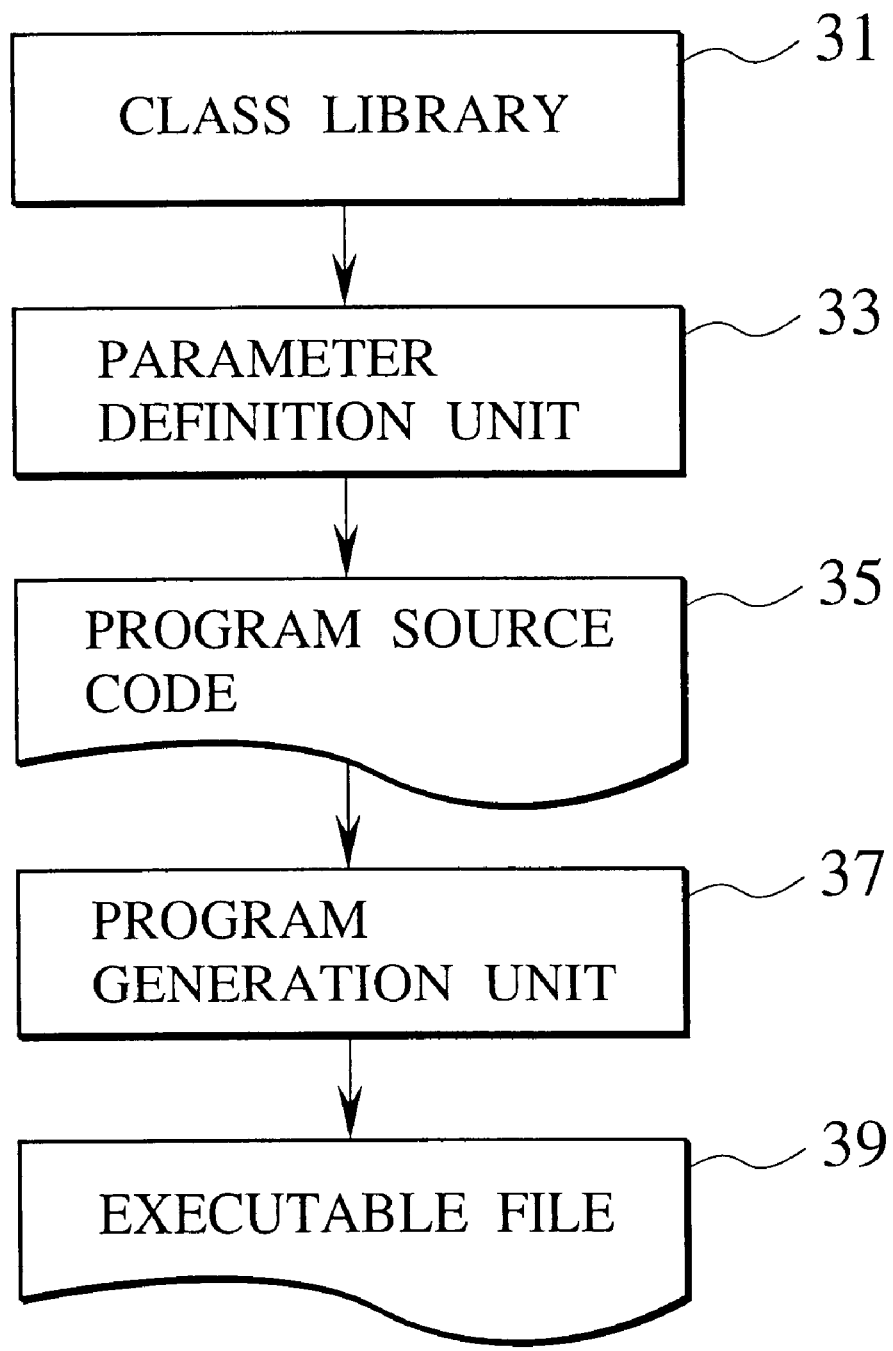
FIG. 5 shows a block diagram of the procedure for generating the executable file according to an embodiment.

FIG. 5 is a view illustrating a conversion process of a conversion class. First, a class for processing is copied from a class library 31. Then, a parameter definition unit 33 defines the instance value of the copied class using a wizard, for example, and then the program source code 35 incorporating the instance value is generated. This will be described in more detail later. The compile processing is carried out by the program generation unit 37, and, as for the program source code 35, an executable file 39 is generated. Information processing according to the embodiment is realized by performing the executable file 39.

EXAMPLE OF USING WIZARDS

FIGS. 6 to 15 are examples of windows which show processing of the definition unit 33 using a wizard. These windows are realized by a graphics user interface (GUI), and a mouse or a keyboard can be used as an input device, for example.

Figure 6:
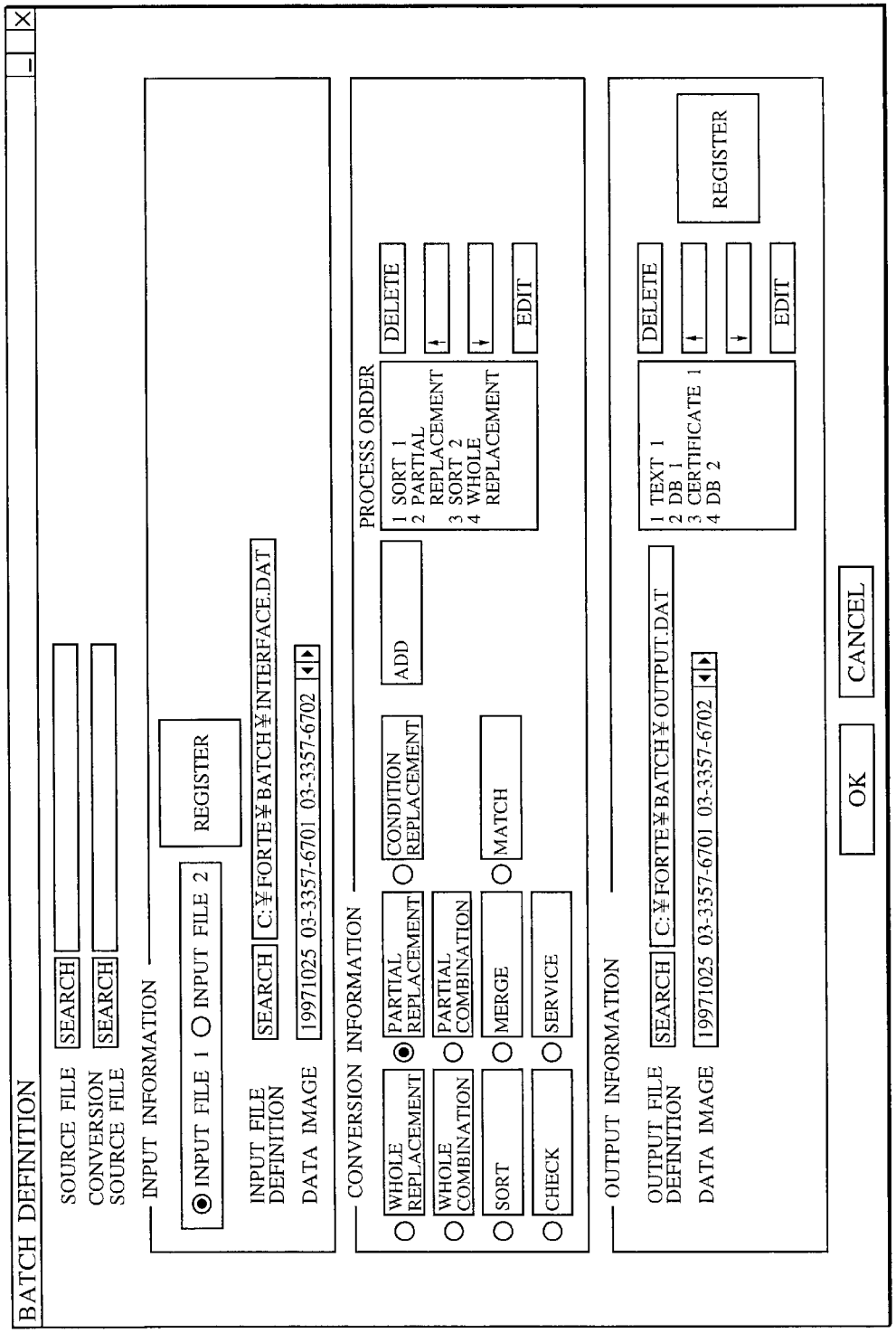
FIG. 6 is a batch definition window according to an embodiment.

FIG. 6 is a batch definition window according to an embodiment of the invention. First, a source file is specified from a class library. If a "SEARCH" button is clicked, the list of source files in the class library will be displayed. Moreover, a new source file name is specified when the file name is different from the source file to input.

Next, an input file is defined as input information. Since there is shown a case of two or more input files, it enables one to specify for each input file. This embodiment shows a case of two files, but it is not limited to just two files. When a definition is completed, a "register" button will be clicked. Then, the detailed definition window of FIG. 7 will be displayed.

Next, conversion processing is defined as conversion information. Processing (method) to be performed, and the order are defined at this section. The type of conversion processing will be displayed like a menu. The button to be converted is clicked, and an "add" button is clicked. Then, the processing is added to the process order. In the process order window, it enables one to delete the process order by clicking the "DELETE" button, or to change the order by clicking the "↑" or "↓" button. Also, it enables to define more detail for the processing order by clicking the "EDIT" button. The detailed definition window of FIGS. 8 to 13 will be displayed when clicking the "edit" button.

Next, an output file is defined as output information. Since there is shown a case of two or more outputs, it can specify each output. When a definition is completed, a "register" button will be clicked. Then, the detailed definition window of FIG. 15 will be displayed.

When all definitions are completed, the "OK" button is clicked. Thereby, a new program source code is generated. An executable file will be generated if this program source code is compiled as explained in FIG. 5.

Figure 7:
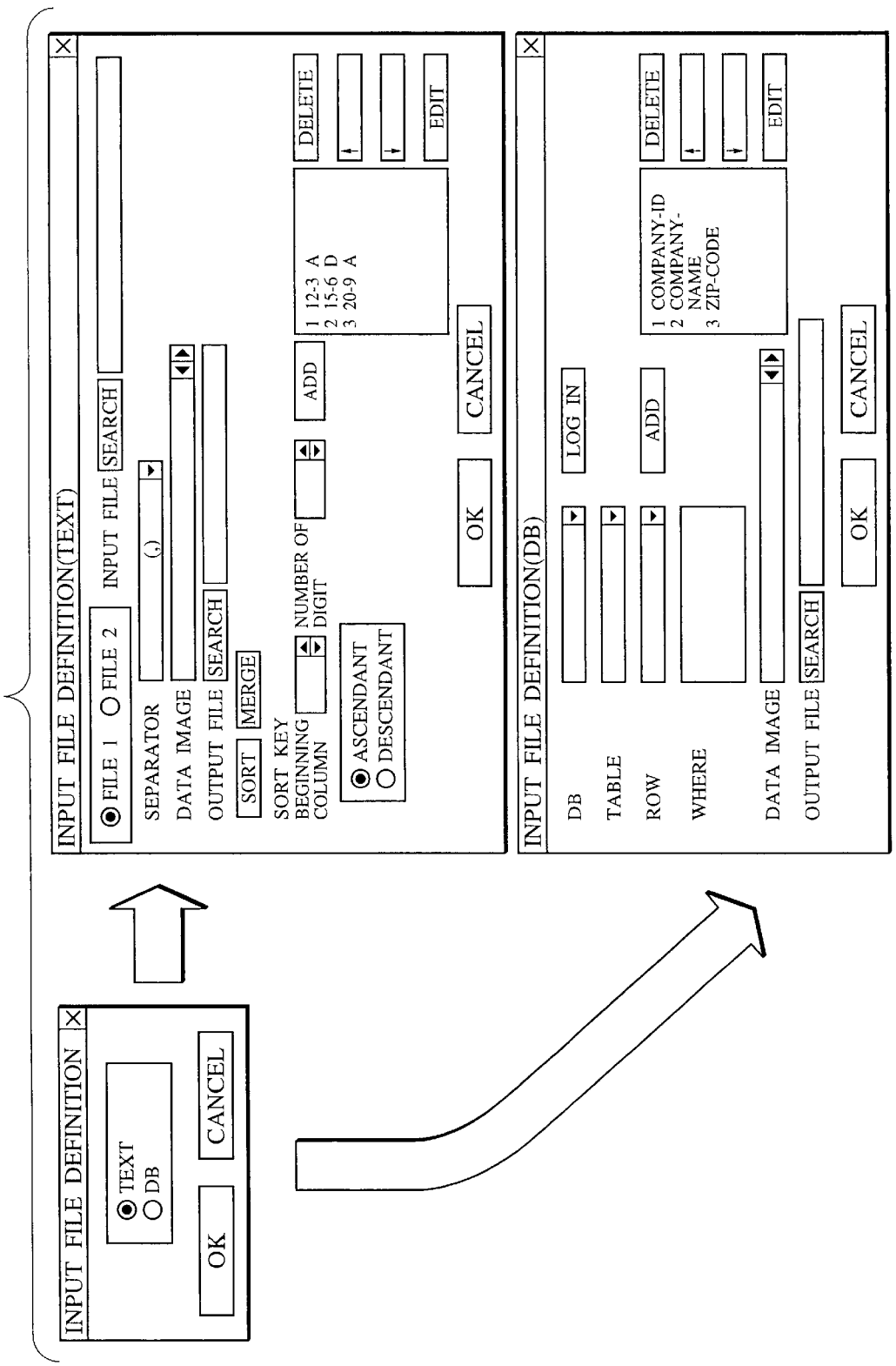
FIG. 7 is a sample window to define an input file.

FIG. 7 is a sample window defining an input file of this embodiment. First, the form of the input file is defined at the left side window of FIG. 7. In this embodiment, the window shows text form and DB form to be defined. When the "OK" button is clicked and text form is specified, the window at the upper right side of the drawing will be displayed. Here, the information about a separator of an input file, and the output file name are specified. Furthermore, processing of an output file such as sorting or merging, is defined. Sorting column and ascendant or descendent are defined when sorting. If sorting with two or more keys, the keys and its order of sorting should be defined.

On the other hand, when DB form is specified, the screen at the lower right side of the drawing is displayed. Here, DB name, a table name, a sequence name, WHERE phrase, and the like are defined. The definitions are registered by the "OK" button in both windows.

FIG. 8 is a sample window to define a partial replacement. First, the file performing partial replacement is specified. Generally, the output file specified at the input file definition is defined as the default. However, when conversion is performed twice or more, the output file of processing before defining in the order of conversion of the window shown in FIG. 6 is defined as the default. A definition of replacement information is specified to input required information, such as code replacement, code separation, code combination, and the like. "OK" button is clicked when all definitions are completed.

FIG. 9 is a sample window to define a whole replacement of this embodiment. First, the file performing whole replacement is specified. Generally, the output file specified at the input file definition is defined as the default. However, when conversion is performing twice or more, the output file of processing before defining in the order of conversion of the window shown in FIG. 6 is defined as the default. A definition of replacement information is specified to input required information, such as character insertion, characters replacement, space compacting, and the like. "OK" button is clicked when all definitions are completed.

Figure 10:
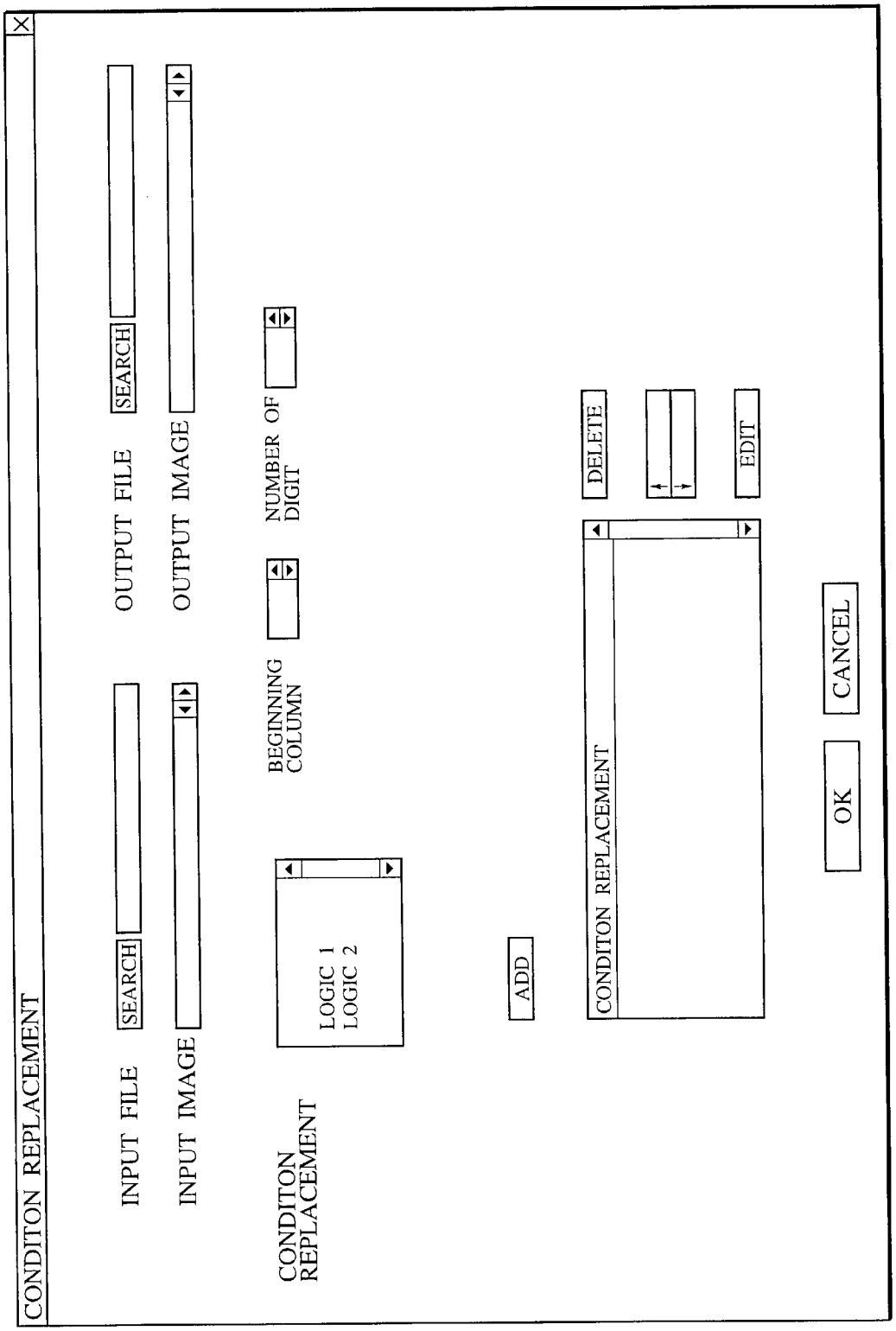
FIG. 10 is a sample window to define a condition replacement.

FIG. 10 is a sample window to define a condition replacement. First, the file performing condition replacement is specified. Generally, the output file specified at the input file definition is defined as the default. However, when conversion is performing twice or more steps, the output file of processing before defining in the order of conversion of the window shown in FIG. 6 is defined as the default. A definition of replacement information is specified to input required information, such as condition logic, beginning column, and number of digit. "OK" button is clicked when all definitions are completed.

FIG. 11 is a sample window to define total calculation processing. First, Input data is specified and the column to be calculated as an item is specified. Next, a data item name is defined and the formula is defined using a function method, an operator pad, a calculation pad, and the like. "OK" button is clicked when all definitions are completed.

FIG. 12A is a sample window to define a matching processing. First, at least one matching key is inputted in a start column and an end column. Next, the conditions of these keys are inputted and a processing related number is inputted. Moreover, an input item, an output item, a calling method, and the like are inputted. "OK" button is clicked when all definitions are completed.

FIG. 12B is a view useful in explaining an example of matching processing. For example, data which consists of A, B, and C shall be stored in the file 1, and A, D, and E shall be stored in a file 2. In this case, data which consists of A, B, D, C, and E as a file 3 will be stored by matching processing.

FIG. 13 is a sample window to define a check processing. First, input data and a beginning column in the input data are defined. Moreover, it defines whether to output in message dialog form as an output of, a check result, whether to output as a text, or whether to output as a certification document. In case there is a check method beforehand, the check method is defined. Here, in a format check, an operator specifies a format such as "YY/MM/DD". In other case, it is outputted in the form specified in output form. The "OK" button is clicked when all definitions are completed.

Figure 14:
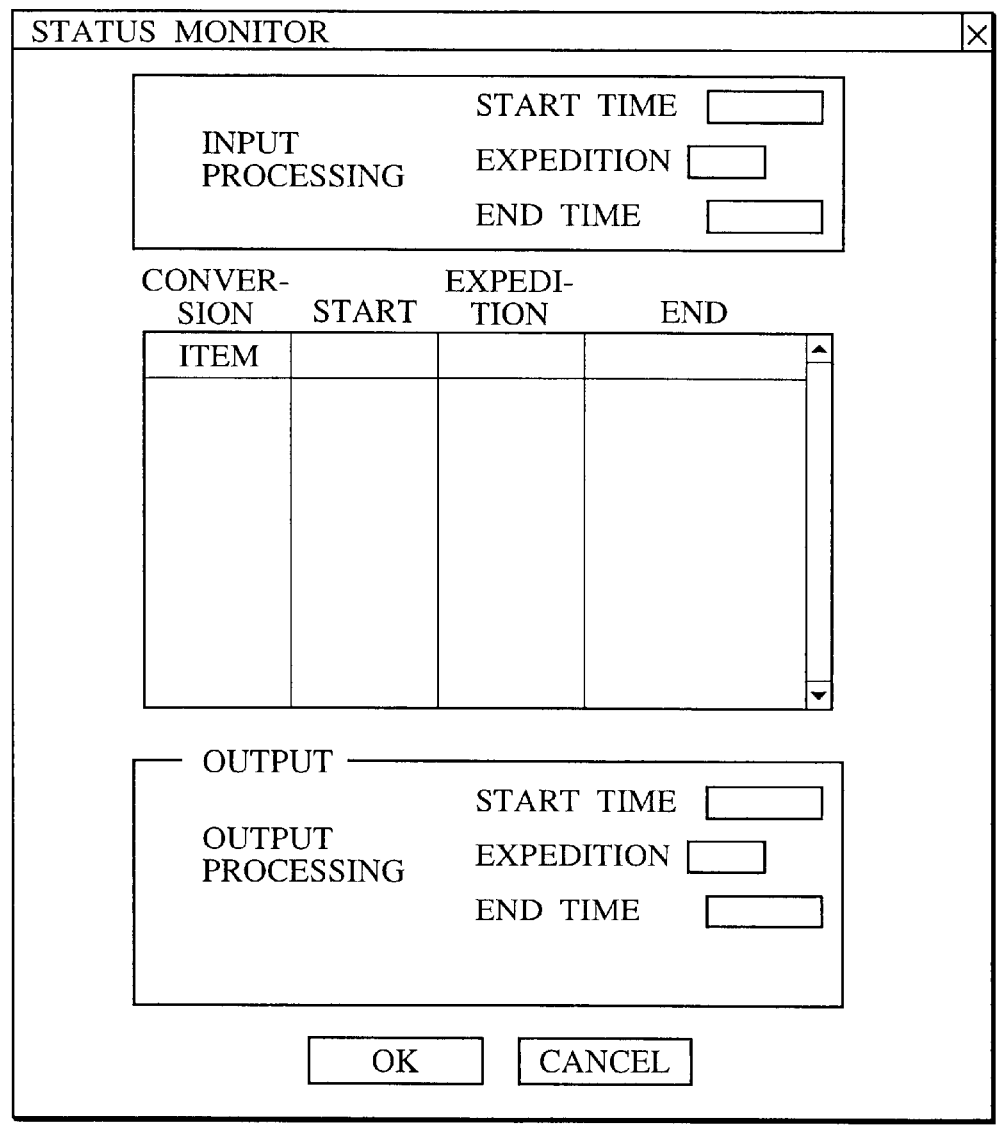
FIG. 14 is a sample window to define a status monitor.

FIG. 14 is a sample window to define a status monitor of an embodiment. This window monitors the processing situation of each class as a status. The start time, elapsed time, end time, and the like are displayed as status of input processing. Moreover, the elapsed time and the like are displayed as status of conversion processing. Also, the start time, elapsed time, end time, and the like are displayed as status of output processing. An operator can grasp the situation of processing by the information in the status monitor.

Figure 15:
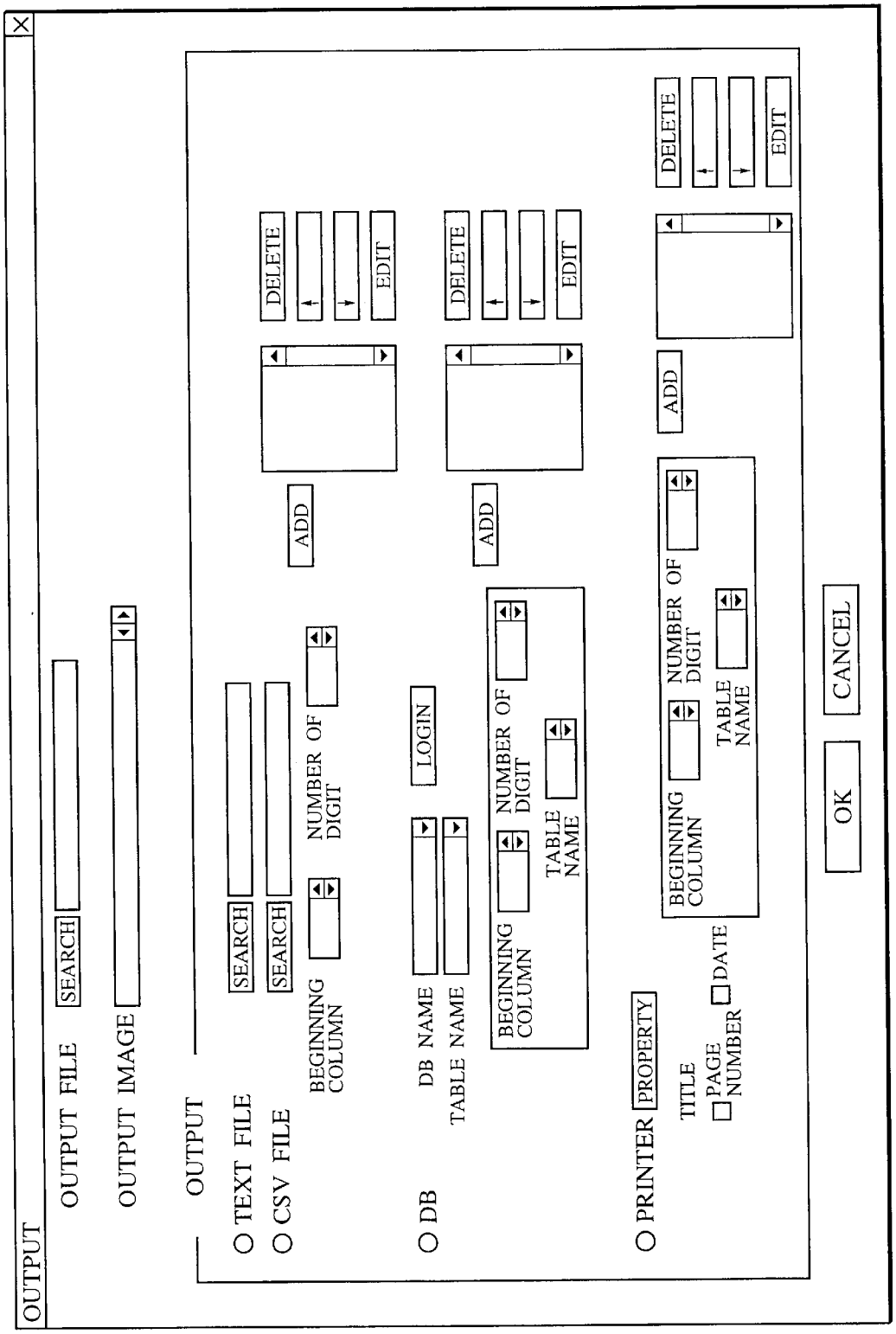
FIG. 15 is a sample window to define an output file.

FIG. 15 is a sample window to define an output file. First, the file to be outputted is specified. Next, the form of the output file is defined. In this embodiment, text form, CSV form, DB form, and a printer are defined. In the case of text form, the file of an output is defined. In the case of CSV form, the file and the column of an output are defined. Moreover, in the case of DB form, DB name, a table name, and the like are defined. In the case of a printer output, the column to output is defined. "OK" button is clicked when all definitions are completed.

FIG. 16 is a sample window to define a system control log. This window defines required information, such as start/end message, the access number, the warning number, and the like, about each processing in a conversion class. Moreover the output of a log is defined whether file form or DB form, also, storing a log is defined such as a file name, DB name. The defined information is outputted to the log maintenance part 29 as a log.

Using the windows mentioned above, if an operator inputs the method, the instance value of an input class, a conversion class, an output class, then the program source code as which processing is specified is generated. This embodiment can be carried out by compiling the program source code, generating the executable file, and performing the executable file.

Since the program created or generated can be easily changed according to the embodiment as explained above, high reusability and maintenance are provided. Thereby, a highly productive system can be achieved.

COMMUNICATIONS BETWEEN APPLICATION PROGRAMS

Next, the embodiment of the application communications system used by this embodiment and the applications communications method will be explained in detail, referring to a drawing. The program generated by the information processing system that prepares above-mentioned program can also generate this communications between application program.

Figure 17:
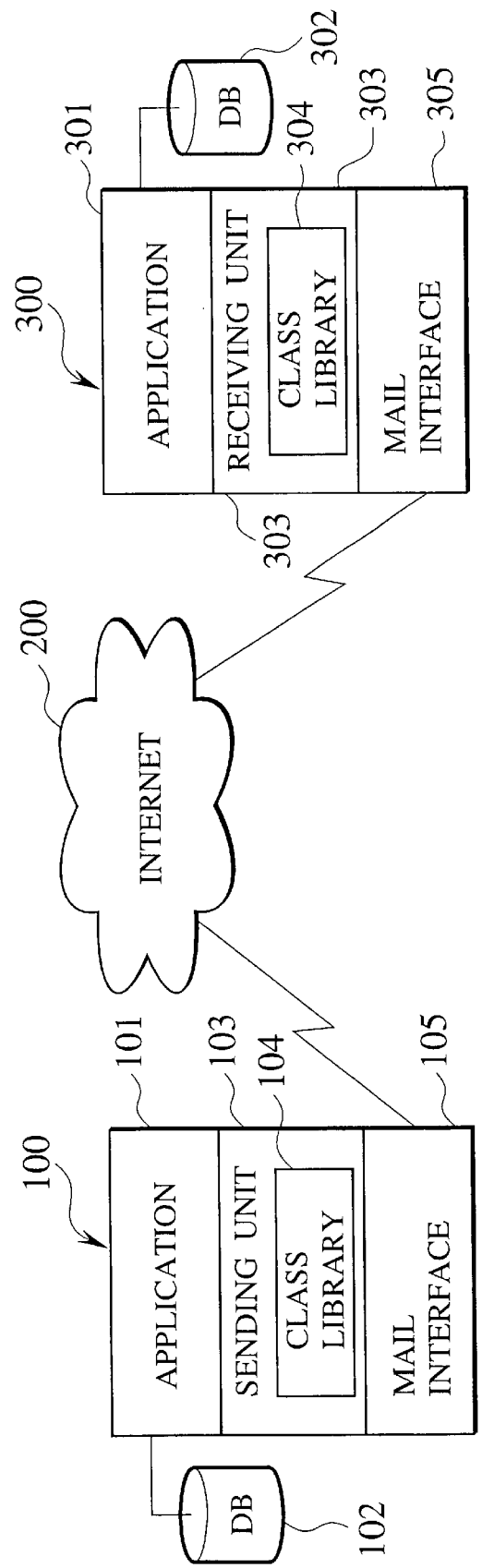
FIG. 17 is a block diagram showing application communications system according to an embodiment.

FIG. 17 is a block diagram showing application communications system according to an embodiment. In this embodiment, the communications between applications performed between a computer system 100 as a sending side and a computer system 300 as a receiving side, will be explained hereinbelow.

The computer system 100 comprises an application unit 101 for executing an application program, and outputting result data, a sending unit 103 for changing the result data into mail form data using the Internet, and a mail interface unit 105 for sending a mail in a mail format for the Internet.

The computer system 300 comprises a mail interface unit 305 for receiving the mail form data from the Internet, a receiving unit 303 for changing the mail form into an application data which an application program can use, an application unit 301 for executing an application program using the application data.

These systems are connected to the internet. It may be possible in connection with the topology of connection, like exclusive line connection, or dial-up connection. In this embodiment, the sending unit 103 and the receiving unit 303 each employs a class library. By using a class library, the system can be built more flexibly.

Next, each element will be explained hereinbelow. First, the application unit 101 and the application unit 301 perform an application. Here, the term "application" includes a business application, like a purchase order application, a receive order application, or an inventory inquiry application for retrieving a database.

Next, the sending unit 103 processes data to transmit so that data produced by the application such as order data, can be transmitted in the mail interface unit 105. The class library 104 is used for processing of data.

Next, the mail interface unit 105 and the mail interface unit 305 are the communication interfaces for exchanging processing result data on a network using the Internet mail. For example, in Windows of Microsoft Co., Winsock library for performing the Internet communications are prepared, and socket library is mounted in UNIX system, and these can be used.

Next, the receiving unit 303 processes data so that data received in the mail interface unit 305 may be decoded and processing may be possible in the application unit 301. The class library 304 is used for processing of data. Here, the term "the Internet" is the computer network over the world.

EXAMPLE OF CLASS LIBRARY

Figure 18:
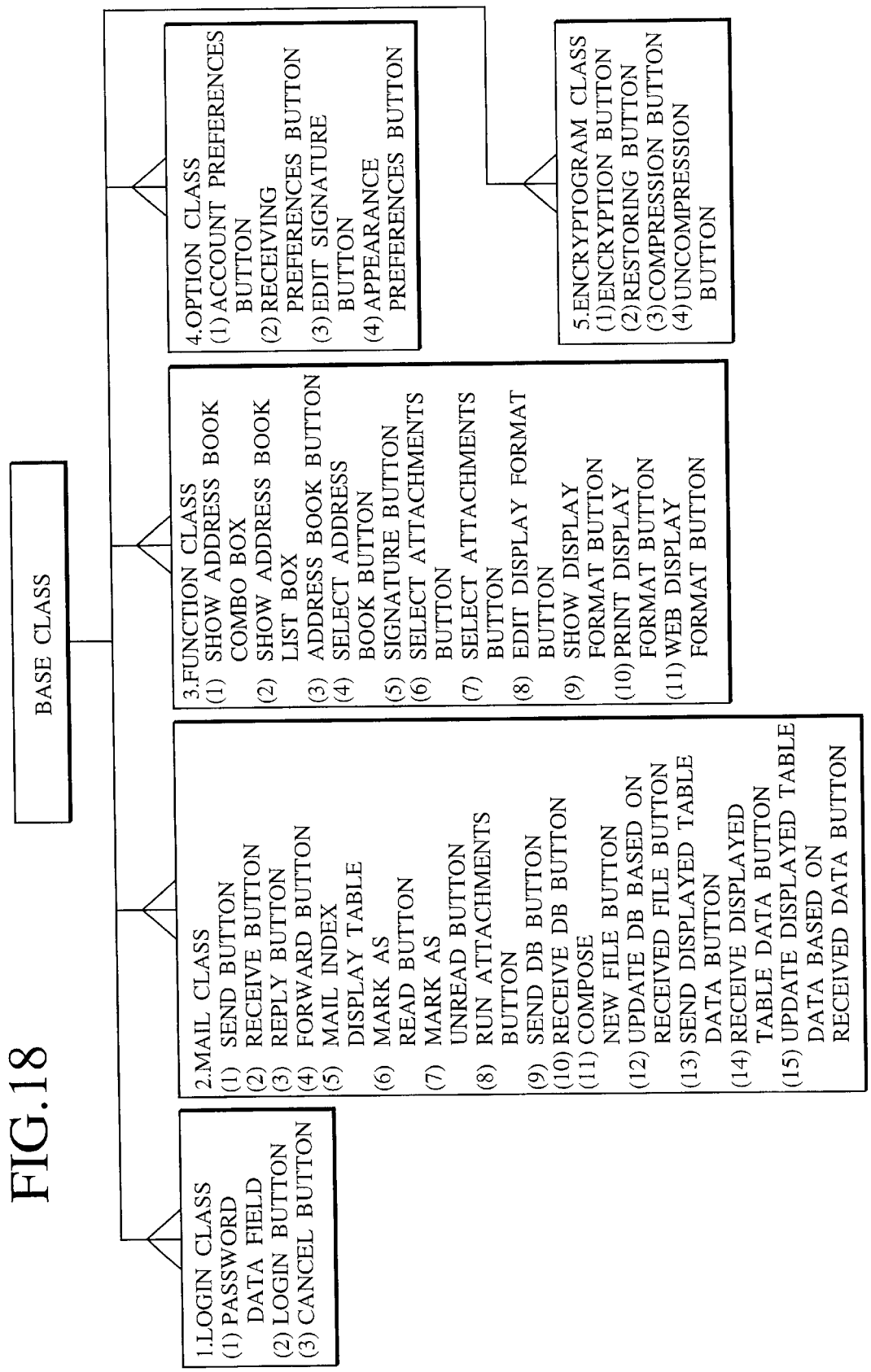
FIG. 18 is a class diagram of sending unit 103 and receiving unit 303 of FIG. 17.

FIG. 18 is a class diagram of sending unit 103 and receiving unit 303 of FIG. 17. A class library is a set of the template for generating an instance, and the behavior is determined when an instance carries out functional inheritance of the specific class from a class library. The software (wizard) by which a user customizes and generates an object is used for this functional inheritance. Therefore, transmitting processing or reception processing is performed using the class (template) stored in the class library.

1. Login Class

Figure 19A:
FIG. 19A is a sample window to define login push button to generate an object.

This login class is a class for authorization. The following members are included.
1) Password Data Field Class The password data field is data field for inputting a password. The inputted characters are displayed as "*" instead of the characters. The string of the inputted password is held temporarily.
2) Login Button Class FIG. 19A is a sample window to define login push button to generate an object. The software, which prompts the operator to input parameters, and generates an object, is often called wizard. First, the wizard prompts an operator to input mailbox folder. The mail account used by each application is registered into the mailbox. An account folder name and a password are set as application information to each mail account, and the variables are beforehand defined as the application information. In FIG. 19A, a variable "dfFolder" is defined as a folder name, also, a variable "dfpassword" is defined as a password.

Moreover, this wizard prompts an operator to input variables defined as the password and the account folder name. An operator clicks a complete button, when ending customization. Thereby, registration of data is performed. On the other hand, an operator clicks a cancel button to stop a customization.

Figure 19B:
FIG. 19B is a login window generated the login push button of FIG. 19A.

FIG. 19B is a login window generated the login push button of FIG. 19A. This window prompts to input a folder name and a password for accessing the folder. And, the system confirms whether folder inputted by the user exists in mailbox folder. When it exists, the string of the inputted password and the password of the account information file in connection with the variable defined by FIG. 19A are compared. When a password is correct, login information is set as a class variable. If incorrect, a message box is displayed, and re-input is required, or the user's login is refused.
3) Cancel Button Class A cancel button class is a class, which closes the dialog displayed. An object is displayed like the "cancel" button of the example in the login window of FIG. 19B, for example, and when a user clicks this button, this dialog is closed.

2. Mail Class

Figure 20A:
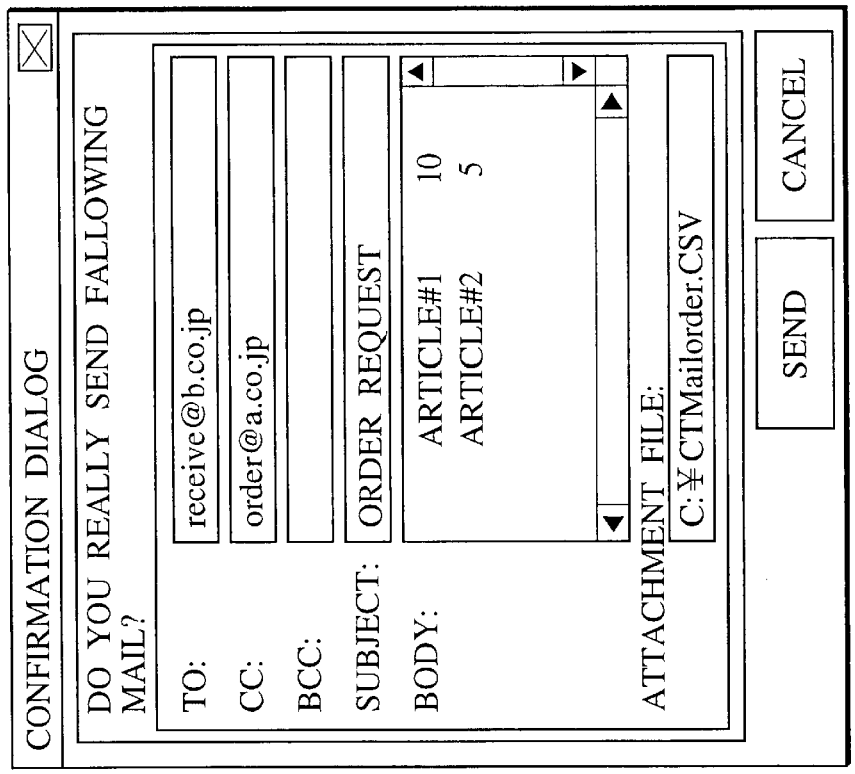
FIG. 20A is a sample window to define send push button to generate an object.

A mail class is a class for performing various kinds of mail transmission and reception. The following members are included.
1) Send Button Class A send button class is a class for performing mail transmission with the contents of the object defined by the wizard. FIG. 20A is a sample window to define send push button to generate an object. This wizard prompts an operator to input a mail box folder first. An addressee (TO:) carbon copy (CC:), a blind carbon copy (BCC:), a subject, a body, an attachment file, and an attachment hard copy are beforehand defined as application information. These are beforehand defined as variables if needed. The address book button mentioned later can define this definition. And, the wizard prompts to input variables defined as the information about applications, such as addressee.

Moreover, the wizard prompts to input whether the check dialog explained below is displayed at the time sending a mail. About an account property button, it is mentioned later. An operator clicks a complete button, when ending customization. Thereby, registration of data is performed. On the other hand, an operator clicks a cancel button to quit a customization window.

Figure 20B:
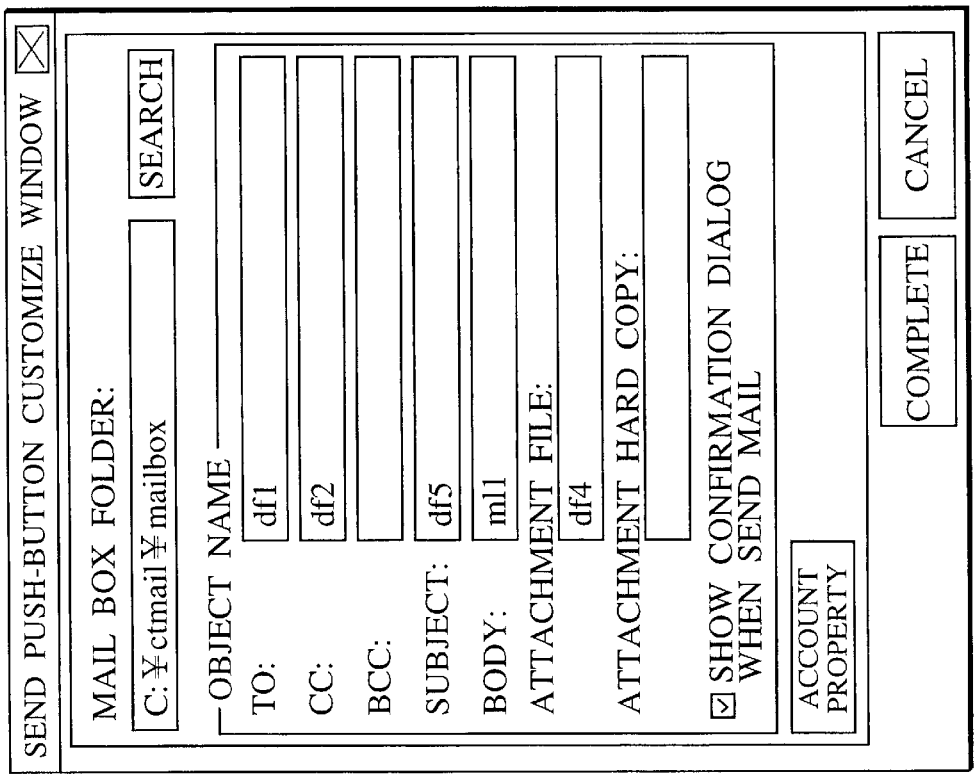
FIG. 20B is a confirmation dialog window generated by the send push button of FIG. 20A.

FIG. 20B is a confirmation dialog window generated by the send push button of FIG. 20A. An operator can check the application information defined by the variables, and the mail is transmitted when the "send" button is clicked by an operator.

2) Receiving Button Class

A receiving button class is a class for receiving mail. FIG. 21A is a sample window which defines receive push button and generate an object. First, the system prompts to input a mailbox folder. About an account properties button and a receiving preference button, it will be mentioned later. An operator clicks a complete button when ending customization. Thereby, registration of data is performed. On the other hand, an operator clicks a cancel button to stop a customize screen.

3) Reply Button Class

A reply button class is a class for replying a mail based on an object defined by the wizard. FIG. 21B is a sample window to define reply push button to generate an object. First, the system prompts to choose a mailbox folder. Also, the system prompts to input whether reply mail is displayed on a window. FIG. 21C is an example dialog for replying mail. Here, the property of a reply mail is defined, for example, whether the original message is quoted when replying message, quote mark, and mailing list for replying. An operator clicks a complete button, when ending customization. Thereby, registration of data is performed. On the other hand, an operator clicks a cancel button to quit a customize window.

4) Forward Button Class

Figure 22A:
FIG. 22A is a sample window to define forward push button to generate an object.
Figure 22B:
FIG. 22B is an example dialog for forwarding mail.

A forward button class is a class for forwarding a mail based on an object defined by the wizard. FIG. 22A is a sample window defining forward push button to generate an object. First, the system prompts to input a mailbox folder. The mail index display table defines a variable as above-mentioned. Also, the system prompts to input whether reply mail is displayed on a window. FIG. 22B is an example dialog for forwarding mail. Here, the property of a forward mail is defined, for example, whether the original message is quoted when forwarding message, quote mark, and the like. An operator clicks a complete button, when ending customization. Thereby, registration of data is performed. On the other hand, an operator clicks a cancel button to quit a customize window.

5) Mail Index Display Table Class

A mail index display table class is a class for displaying mails in the mailbox as a list. FIG. 23A is a sample window to define mail index display table to generate an object. First, the system prompts to input a mailbox folder, and object name. The form of a display, a transmitting person (FROM:), addressee (TO:), a carbon copy (CC), a subject, a body, an attachments file, and status are beforehand defined as application information. Also these are defined beforehand as variables if needed. Then, the wizard prompts to input variables defined as the application information, such as a form. About an appearance preferences button will be mentioned later. An operator clicks a complete button, when ending customization. Thereby, registration of data is performed. On the other hand, an operator clicks a cancel button to quit a customize window.

FIG. 23B is a mail index display table generated by a confirmation dialog window,generated by the send push button of FIG. 20A. The window displays the application information defined by the variables. The attachment file may be displayed as a detailed information by double-clicking the subject, and the like.

6) Mark as Read Button Class

A mark as read button class is a class which changes unread status of the mail chosen in the mail index display table to read status. FIG. 23C is a sample window which defines mail index display table to generate an object. Firstly, the system prompts to input a mailbox folder and a mail index display table name. For example, in FIG. 23B, if a mail is selected, and "mark as reads" button (lower left side) is clicked, status of the selected mail will be changed from "UN" (unread) to "RE" (read).

7) Mark as Unread Button Class

Mark as unread button class is a class which changes read status to unread status. FIG. 23C is a sample window defining mail index display table to generate an object. First, the system prompts to input a mailbox folder and a mail index display table name. For example, in FIG. 23B, if a mail is selected, and "mark as unread" button (lower right side) is clicked, status of the selected mail will be changed "RE" (read) to "UN" (unread).

8) Run Attachments Button Class

A run attachments button class is a class for executing the program if attachment file appended to the receiving mail is an executable program. It can determine by the filename (for example, "exe" of file.exe) whether the attachment file is executable or not.

9) Send DB Button Class

A send DB button class is a class for transmitting the part or all of database. DB to be sent is specified and converted into file format such as DB proprietary format, CSV form using this class. Send button class will be employed in case of sending the explanation will be omitted here since it is mentioned above.

10) Receive DB Button Class

A receive DB button class is a class for receiving the part or all of DB. An attachment file which is appended to a received mail is stored by using this class. A form of a file may be checked before stored. Receive button class will be employed in case of receiving the explanation and will be omitted here since it mentioned above.

11) Compose New File Button Class

A Compose new file button class is a class for creating a transmitting file. For example, the system prompts an operator to input such as text by using a software such as an editor. The text includes a document, a program (for example, program of interpreter type, and Java), and the like. The created text is stored as a file temporarily.

12) Update DB Based on Received File Button

An Update DB based on received file button is a class for updating to DB based on the file which received. For example, the file of DB is received using DB receiving button class, and predetermined DB is updated based on the file.

3. Function Class

The following members are included.

1) Show Address Book Combo Box Class

Figure 24A:
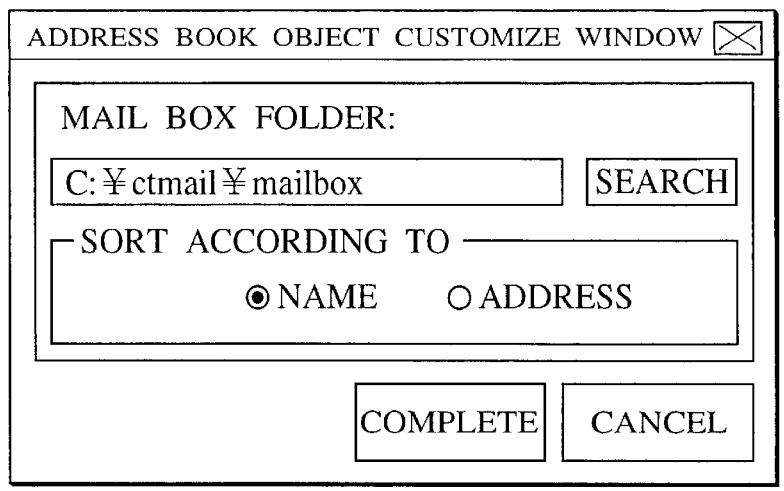
FIG. 24A is a sample window to define address book display combo box to generate an object.

A show address book combo box class is a class for displaying the address book which manages the address of mail, in combo box form, to be chosen by an operator. FIG. 24A is a sample window defining address book display combo box to generate an object. First, the wizard prompts an operator to input the mail box folder to display, and to choose in toggle button form whether the address book is sorted by a name, or an address. An operator clicks a complete button, when ending customization. Thereby, registration of data is performed. On the other hand, an operator clicks a cancel button to quit a customize window.

2) Show Address Book List Box Class

A show address book list box class is a class for displaying the address book which manages the address of mail, in list box form. FIG. 24A is a sample window defining address book display list box to generate an object. First, the system prompts an operator to input the mail box folder to display, and to choose in toggle button form whether the address book is sorted by a name, or an address. An operator clicks a complete button, when ending customization. Thereby, registration of data is performed. On the other hand, an operator clicks a cancel button to stop a customize window.

3) Address Book Button Class

Figure 24B:
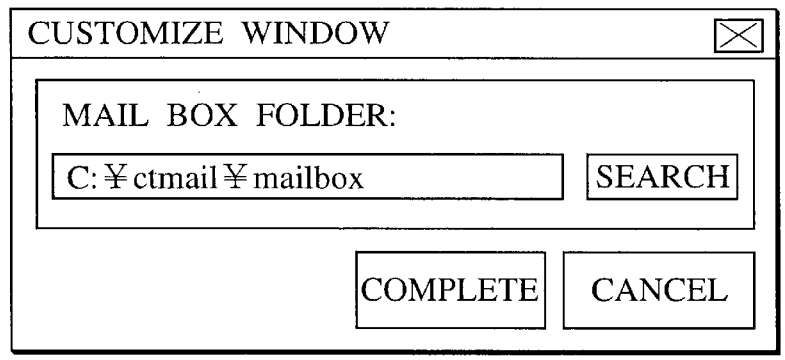
FIG. 24B is a sample window to define address book button to generate an object.

An address book button class is a class for displaying the registration dialog of an address book and maintaining an address book. FIG. 24B is a sample window defining address book button to generate an object. First, the system prompts an operator to input the mail box folder. An operator clicks a complete button, when ending customization. Thereby, registration of data is performed. On the other hand, an operator clicks a cancel button to quit a customize window.

Figure 24C:
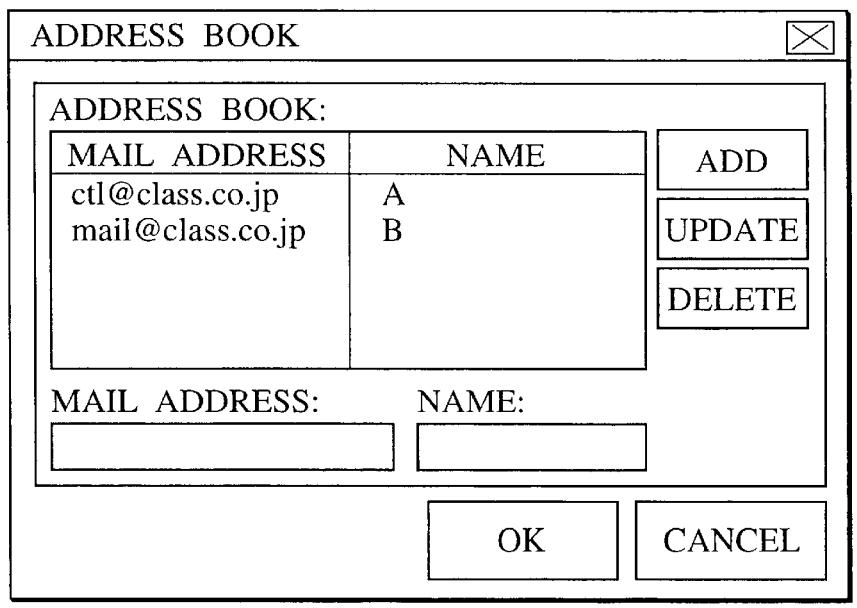
FIG. 24C is a window generated by the customize window of FIG. 24B.

FIG. 24C is a window generated by the customize window of FIG. 24B. In FIG. 24C, the address book which exists in the selected mailbox folder is displayed. An operator inputs the mail address and the name in the bottom of the FIG. 24C, and they register with an address book temporarily when clicking a "additional" button. And they register with an address book permanently when clicking a "Update" button. On the other hand, an operator needs to delete a mail address, an operator clicks "delete" button to perform deletion from an address book.

4) Select Address Book Selection Button Class

Figure 25A:
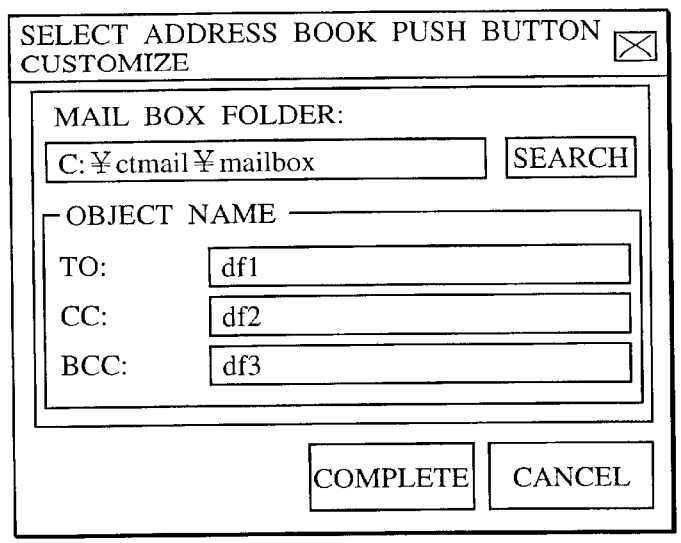
FIG. 25A is a sample window to define select address book push button to generate an object.

A select address book button class is a class for displaying the dialog of address book selection. FIG. 25A is a sample window defining select address book push button to generate an object. First, the wizard prompts to input a mailbox folder and to input an object name to define variables. For example, "df1" is defined as an addressee (TO) on this window, "df2" is defined as a carbon copy (CC), and "df3" is defined as a blind carbon copy (BCC). An operator clicks a "complete" button, when ending customization. Thereby, the data is registered. On the other hand, an operator clicks a "cancel" button to quit a customize window.

Figure 25B:
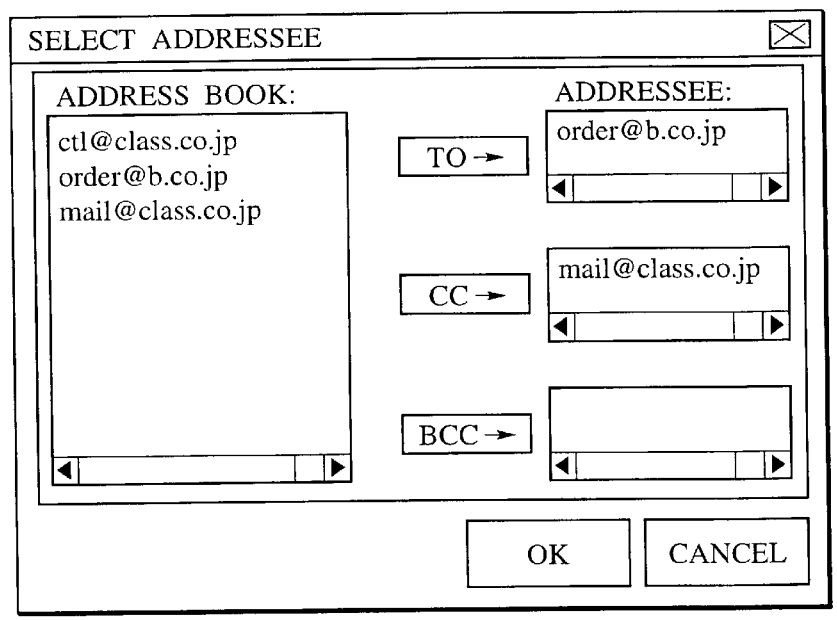
FIG. 25B is a window generated by the select address book push button of FIG. 25A.

FIG. 25B is a window generated by the select address book push button of FIG. 25A. An operator selects mail addresses from displayed address book. Selected mail addresses are displayed in "To" field, "CC" field, and "BCC" field on a right-hand side addressee column of FIG. 25A. In this embodiment, by clicking "OK" button, mail address "orderEb.co.jp" is defined as the variable "df1". Also, address "mailEclass.co.jp" is defined as the variable "df2". An operator clicks a complete button, when ending customization. Thereby, registration of data is performed. On the other hand, an operator clicks a cancel button to quit a customize window.

5) Signature Button Class

Figure 25C:
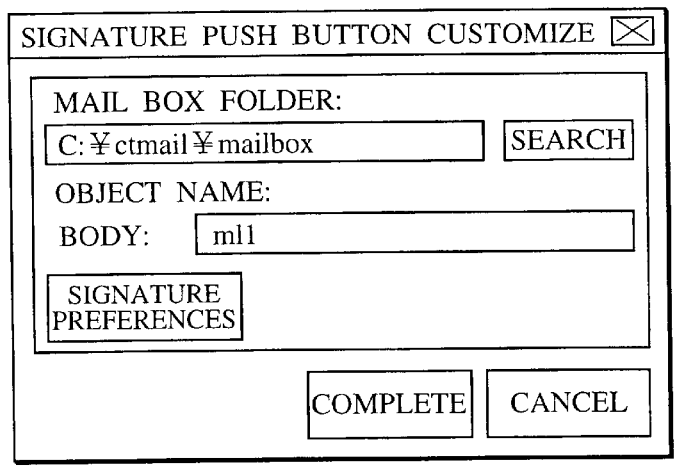
FIG. 25C is an example wizard window to define signature push button to generate an object.

A signature button class is a class for adding a signature which describes company information or individual information into the mail body. FIG. 25C is an example wizard window defining signature push button to generate an object. First, the wizard prompts to input a mail folder, and a signature file. They define the variable here as abovementioned. About a signature preferences button of FIG. 25C, since it is explained at the signature edit button class, the explanation will be omitted here. An operator clicks a complete button, when ending customization. Thereby, registration of data is performed. On the other hand, an operator clicks a cancel button to quit a customize window.

6) Store Attachments Button Class

Figure 26A:
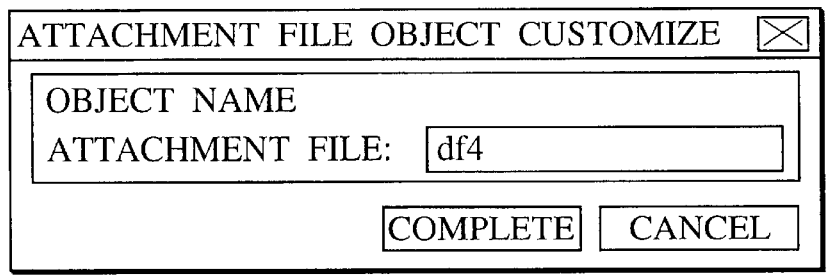
FIG. 26A is a sample window of attachment file button to generate an object.
Figure 26B:
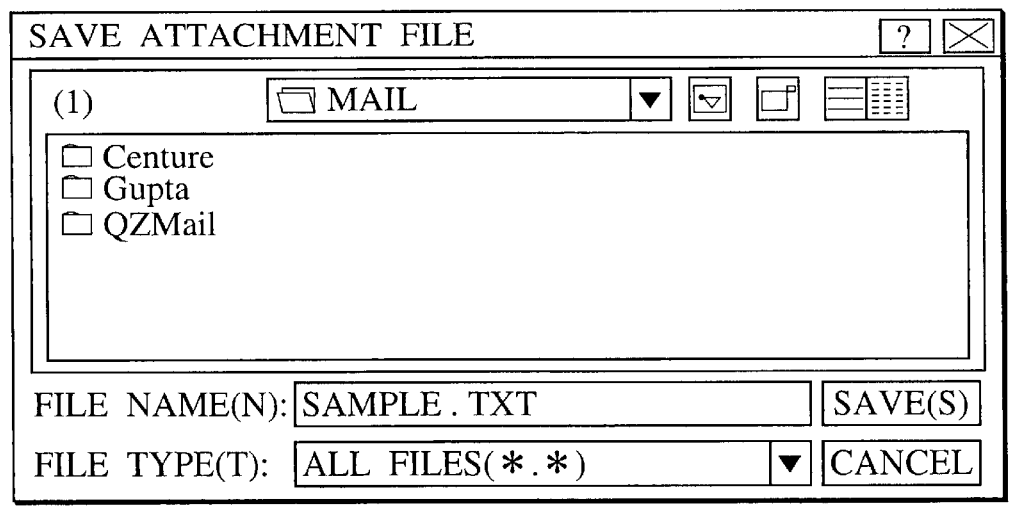
FIG. 26B is a save attachment file window generated by the attachment file button of FIG. 26A.

A store attachments button class is a class for saving the attachment file of a receiving mail displayed on the object set up by the wizard to the specified place. FIG. 26A is a sample window of attachment file button to generate an object. Here, the wizard prompts to input an object name of an attachment file. FIG. 26B is a save attachment file window generated by the attachment file button of FIG. 26A. The attachment file defined by the variable is saved in the place where the user is specified, such as a folder. In the case of storing, an operator specifies a file name of the attachment file. Storing is performed by clicking the "save" button after the operations.

7) Select Attachment File Button Class

Figure 26C:
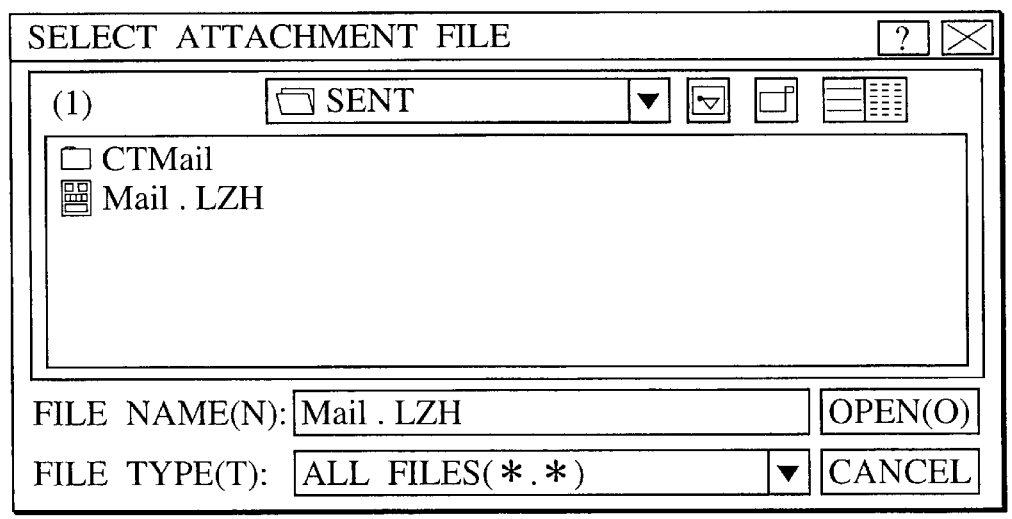
FIG. 26C is a select attachment file window generated by the attachment file button of FIG. 26A.

A select attachment file button class is a class for appending a file to a sending mail displayed on the object set up by the wizard. FIG. 26A is a sample window of attachment file button to generate an object. Here, the wizard prompts to input an object name of an attachment file. FIG. 26C is a select attachment file window generated by the attachment file button of FIG. 26A. The specified file is defined as a variable.

8) Edit Display Format Button Class

Figure 27A:
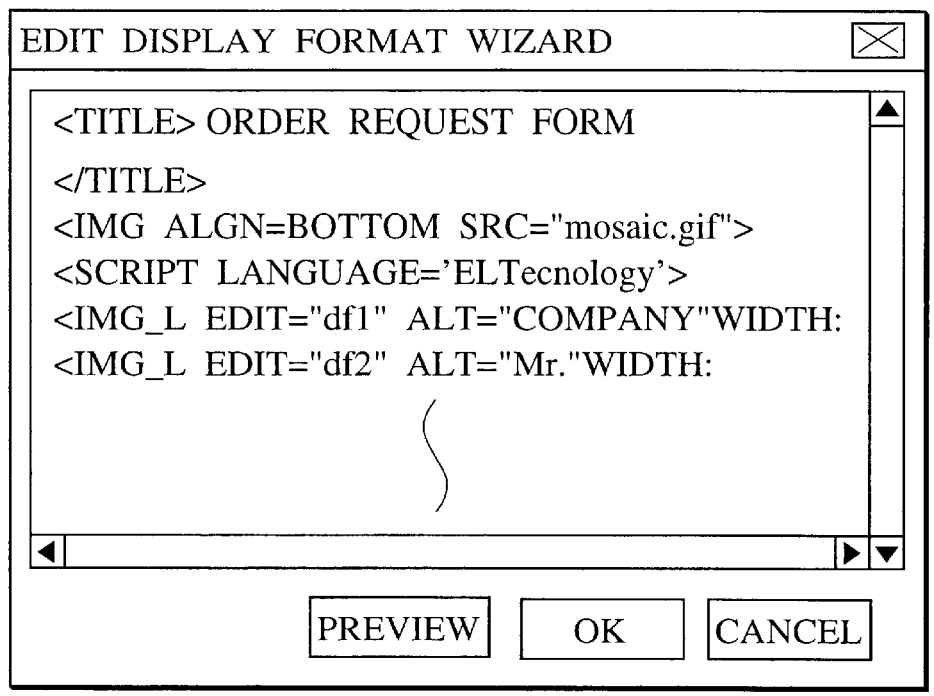
FIG. 27A is a sample window of edit mail wizard.

An edit display format button class is a class for displaying data item by an application program at an editable window. FIG. 27A is a sample window of edit display format wizard. An operator can edit display format file to describe a program, a script, including an object name of a program and a title, according to the grammar of a language such as HTML (HyperText Markup Language).

9) Show Display Format Button Class

Figure 27B:
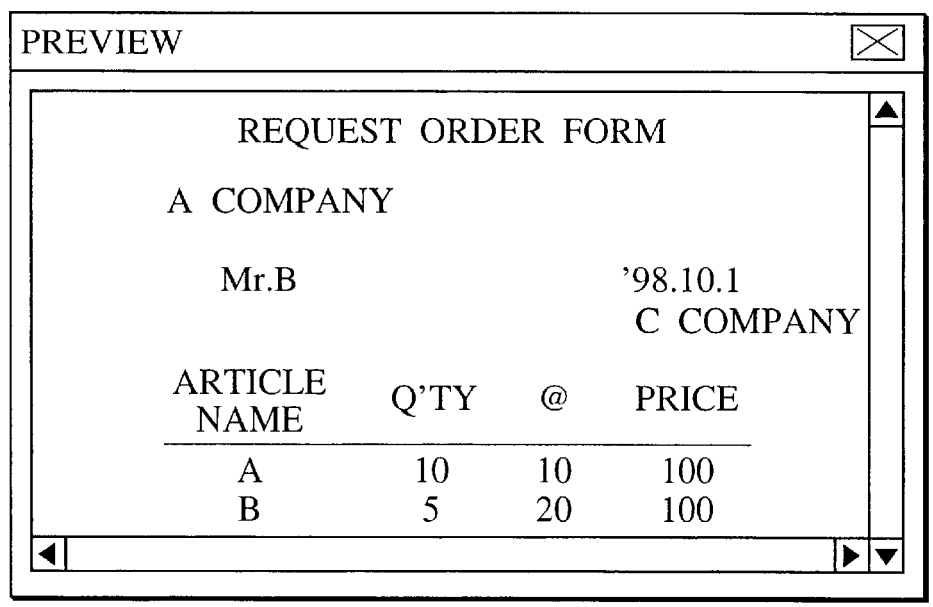
FIG. 27B is an example preview window displayed in case preview button of FIG. 27A is clicked.

A show display format button class is a class for executing and displaying a program or script described at the edit display format button class. FIG. 27B is an example preview window displayed in case of "preview" button of FIG. 27A is clicked. An operator can describe by checking the format to click the "preview" button.

10) Print Display Format Button Class

A print display format button is a class for printing a display format at the show display format button class.

11) Web Display Format Button Class

A web display format button class is a class for executing a script or program at the edit display format button and generating a displayable file at the Web browser.

4. Option Class

The following members are included.

1) Account Preferences Button Class

Figure 28B:
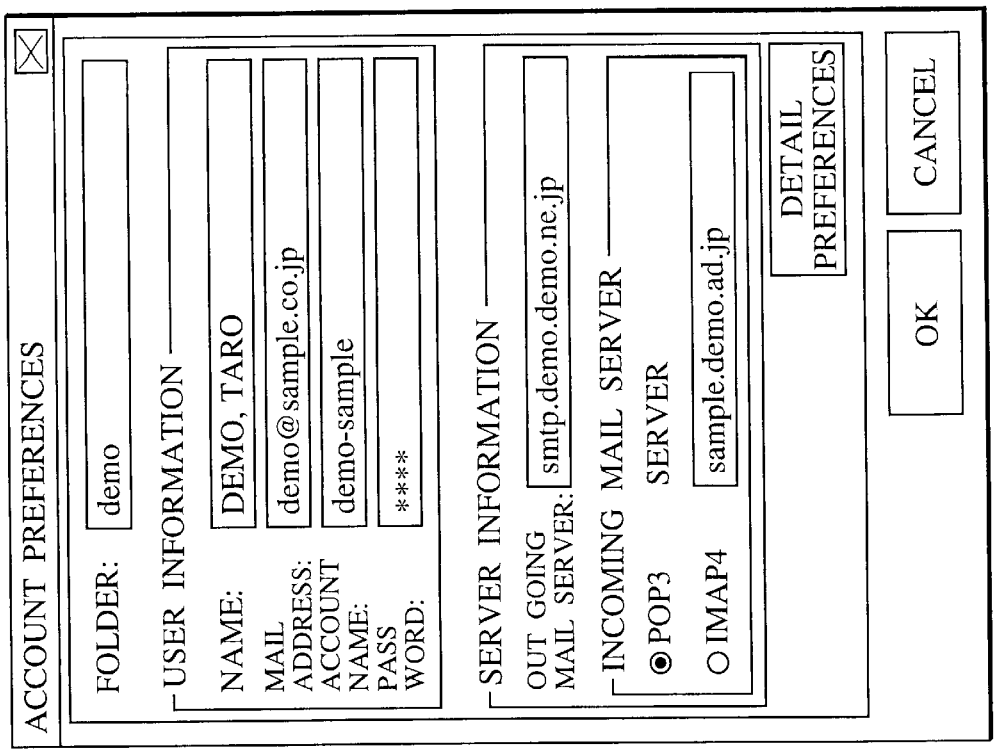
FIG. 28B is a account preference window generated by the customize window of FIG. 28A.
Figure 28A:
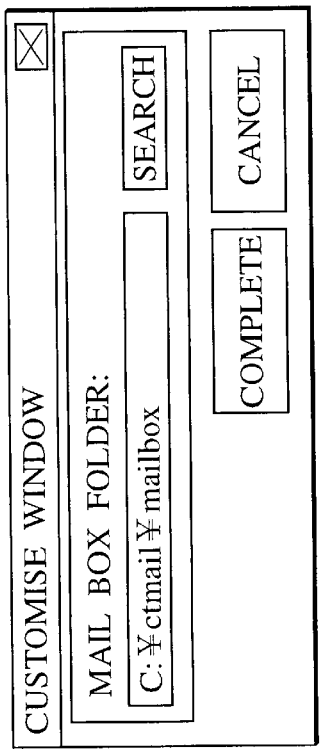
FIG. 28A is an example of a customize window.
Figure 28C:
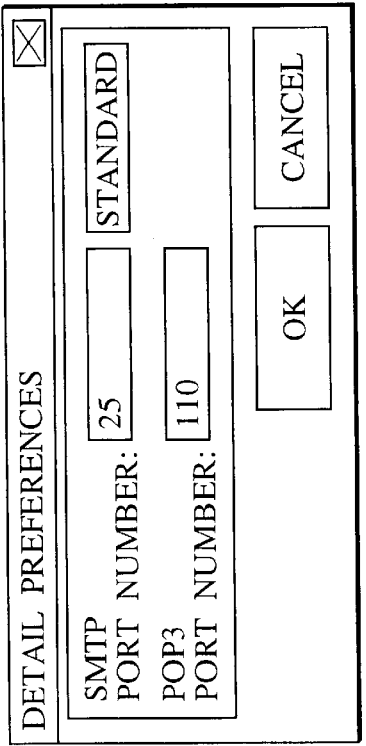
FIG. 28C is detail preference window displayed in case of detail preference button of FIG. 28B is clicked.

An account preferences button class is a class for displaying an account preferences dialog and setting as application information. FIG. 28A is an example of a customize window for account setup. The wizard prompts to input a mail box folder. FIG. 28B is an account preferences window generated by the customize window of FIG. 28A. More detail, this dialog is displayed in case of clicking "account preferences" button in FIG. 21A. The wizard prompts to input a folder name of an account, a user name, a mail address, an account name, and a password, as account preferences. Moreover, the wizard prompt to input server information, for example, an SMTP server name, and a receiving mail server name, and the like. FIG. 28C is detail preference window displayed in case of detail preference button of FIG. 28B is clicked. Here, the wizard prompts to input an SMTP port number and a POP3 port number as a detailed setup of mail server.

2) Receiving Preference Button Class

Figure 29A:
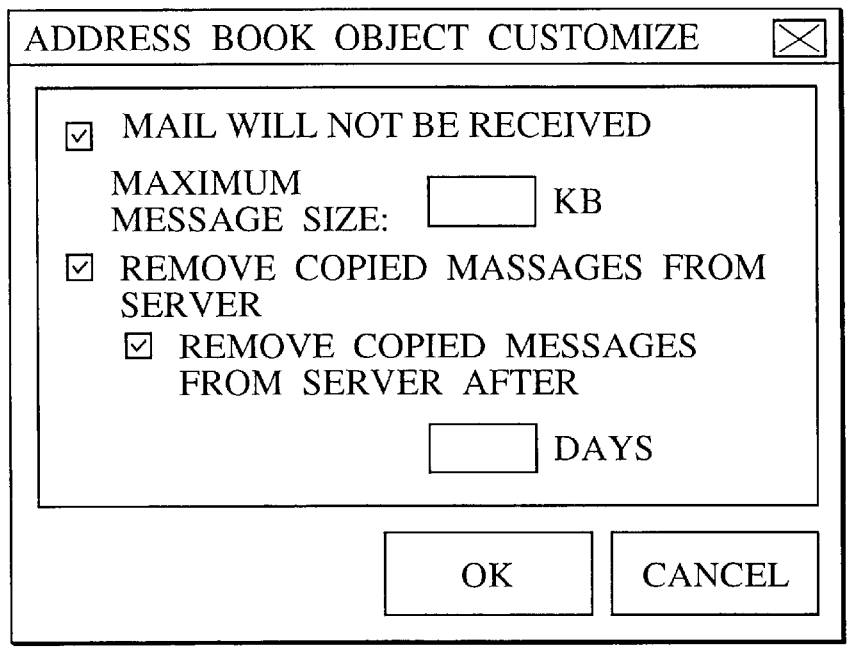
FIG. 29A is an address book object customize window generated by the customize window of FIG. 28A.

A receiving preference button class is a class for displaying a receiving option setting dialog and application setting information. The wizard prompts that mailbox folder will be customized, as shown in FIG. 28A. FIG. 29A is an address book object customize window generated by the customize window of FIG. 28A. Specifically, the dialog of FIG. 28A is displayed by clicking the receiving option button of FIG. 21A. Here, the wizard prompts to input setup information about limitation of maximum mail size, and whether remove copied messages from server or not.

3) Edit Signature Button Class

An edit signature button class is a class for displaying signature edit dialog and generating a signature file.

FIG. 28A is an example of a customize window for customizing the edit signature button class to generate an object. The wizard prompts to input a mail box folder.

Figure 29B:
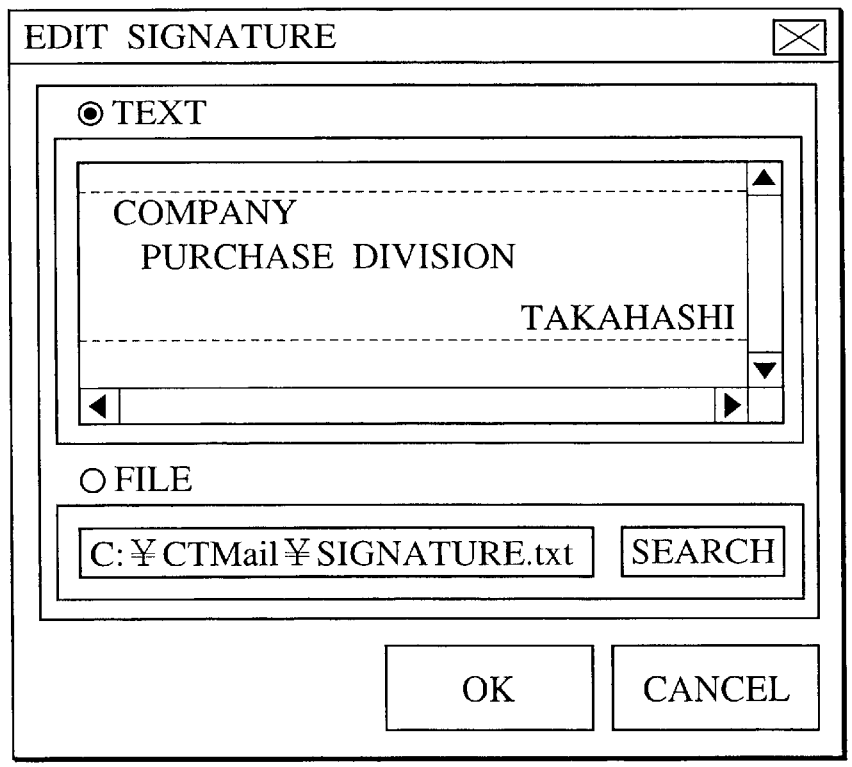
FIG. 29B is an edit signature window generated by the customize window of FIG. 28A.

FIG. 29B is an edit signature window generated by the customize window of FIG. 28A. Specifically, the dialog of FIG. 28B is displayed by clicking the "signature preferences" button of FIG. 25C. In performing signature edit, when choosing a text, an operator can directly input into the editor under the "text" toggle button. On the other hand, when choosing a file, an operator specifies a signature file under the "file" toggle button.

4) Appearance Preferences Button Class

An appearance preferences button class is a class for displaying an appearance preferences dialog and setting as application information. FIG. 28A is an example of a customize window. The wizard prompts to input a mail box folder.

Figure 30:
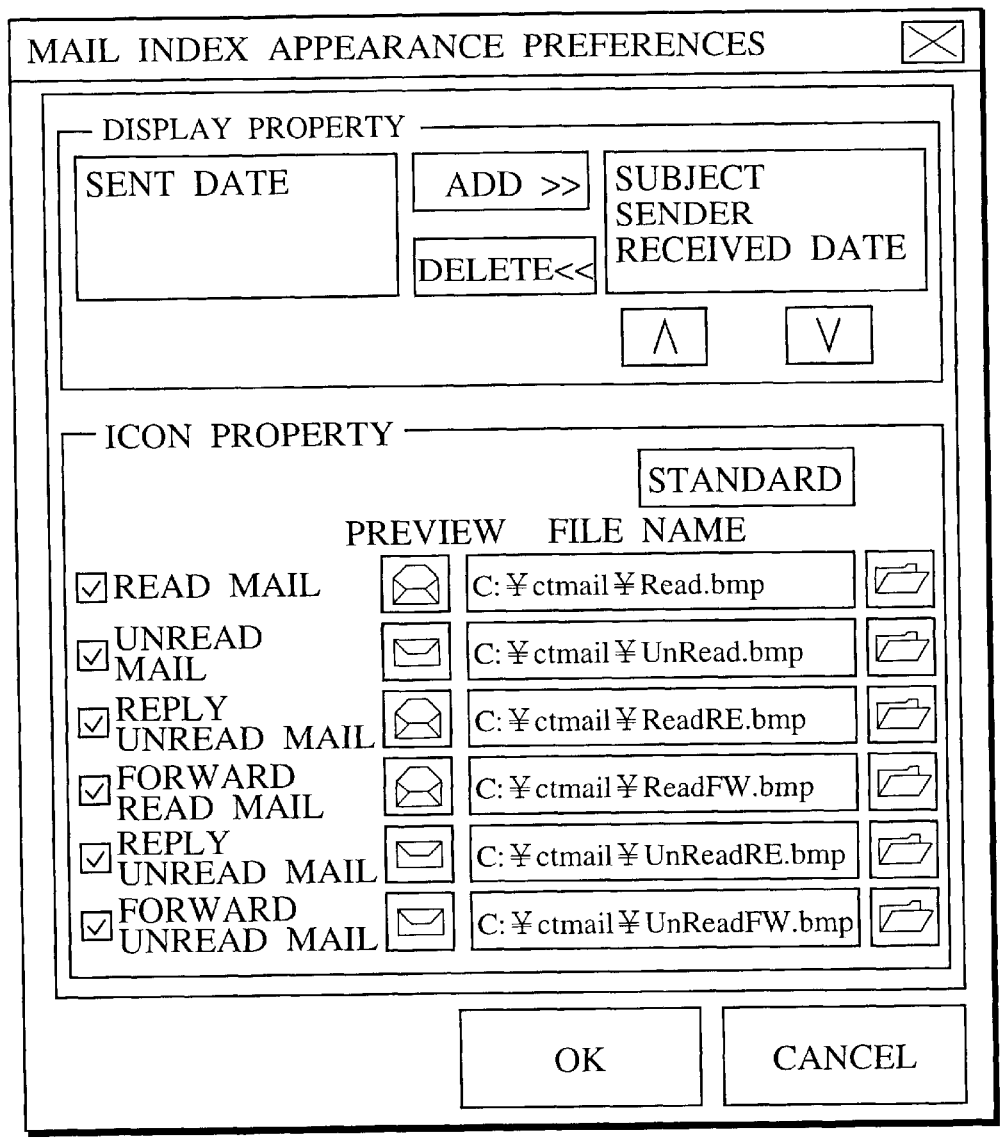
FIG. 30 is a mail index display property generated by the customize window of FIG. 28A.

FIG. 30 is a mail index appearance preferences generated by the customize window of FIG. 28A. The dialog of FIG. 30 is displayed by clicking the display setting button of FIG. 23A. A display setup of a mail index performs a setup of a display item and a setup of a display bit map, etc.

5. Encryption class

The following members are included.

1) Encryption Button Class

Figure 31:
FIG. 31 is a sample window of encryption/restoring push button to generate an object.

An encryption class button is a class for performing an encryption about the content of a mail such as a body, attachment. FIG. 31 is a sample window of encryption push button to generate an object. The wizard prompt to input a key and an object name. The contents such as a body, and attachment inputted into the object name are encrypted according to the key, and transmission is carried out.

2) Decryption Button Class

A decryption class button is a class for performing a decryption about the content of a mail such as a body, attachment. FIG. 31 is a sample window of decryption push button to generate an object. The wizard prompt to input a key and an object name. The contents such as a body, and attachment inputted into the object name are decrypted according to the key.

3) Compression Button Class

A compression button class is a class for compressing a file such as an attachment file. All classes for sending such as send button class, reply button class, send DB button class, encryption button class, and all sending file form, such as DB (including CSV), encryption file, displayed table data can apply this button as an optional function.

4) Uncompression Button Class

An uncompression button class is a class for uncompressing a compressed file such as an attachment file. All classes for receiving such as receive button class, run attachment button class, send, decryption button class, and all compressed receiving file form, such as compressed DB (including CSV), compressed encryption file, compressed displayed table data can apply this button as an optional function.

Hereafter, the 1st example of the method performing communications between applications is explained using an above-mentioned class library. In this example, the sending system transmits an order form by the order application. On the other hand, the receiving system receives the form and registers it with a database. In the sending system, suppose the order application shall be created and a setup of an above-mentioned variable etc. shall be made.

First, the sending system performs authorization before executing an order application. In this case, the system prompts an operator to input a folder name and a password, as shown in FIG. 19B. When a password is authorized, the application explained below is performed. FIG. 32A is a purchase order window according to the first example. In order to order a certain article, an operator specifies a company, a delivery date, an article to be ordered. When there is the necessity for reference of articles, the articles are retrieved by clicking a "retrieve" button. Moreover, when outputting the contents of the order, a list output can be performed if a list "print" button is clicked. An "place order" button is clicked when the order form is completed. Then, the dialog of the transmitting check shown in this FIG. 32B is displayed.

FIG. 32B is a confirmation sending dialog according to the first example. This dialog can omit as above-mentioned. The addressee is assigned to the mail address defined in FIG. 32A. And CC is assigned to its mail address for confirmation. Also, The subject is assigned automatically. In the body, an order place and the delivery date specified by FIG. 32A are inserted, and the signature file is incorporated. Furthermore, the articles which place an order are appended and transmitted in the form of an attachment file. Here, the form of an attachment file is not restricted to it, although it transmits another format such as CSV.

In transmitting, an operator clicks "send with encryption" button if encryption required. An operator clicks "send" button if no encryption required. On the other hand, an operator clicks "cancel" button if transmission is canceled. The "send" button or "send with encryption" button is clicked, the mail is transmitted to the addressee via the Internet with the mail interface.

FIG. 33 is a receiving order window according to a first example. First, an operator clicks "receive" button to process receiving order. Then, the mail transmitted from the sending system is displayed. A "decryption" button is clicked when the contents of the transmitted mail are encrypted. For example, a "reply" button is clicked to reply the mail, when the article of the order cannot be delivered by delivery date. The received order is registered with database, by clicking a "register" button.

Figure 34A:
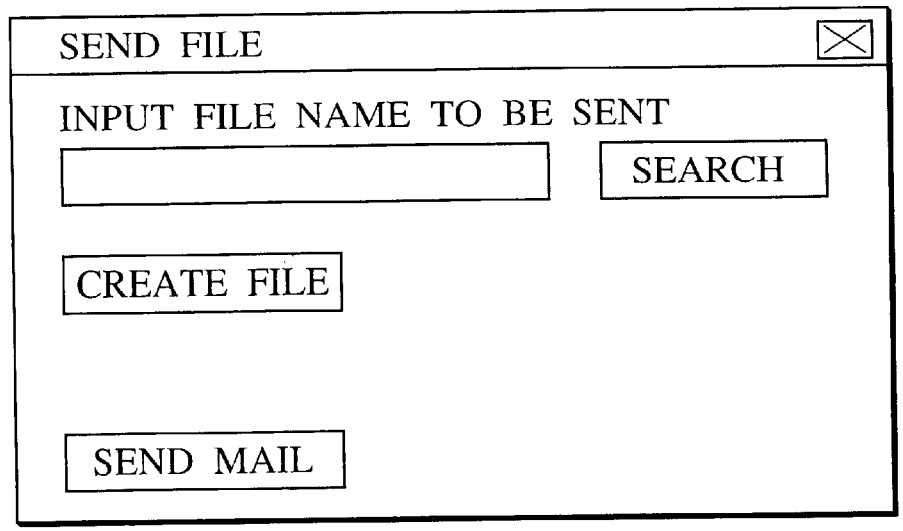
FIG. 34A is a sample window of sending file window according to a second example.
Figure 34B:
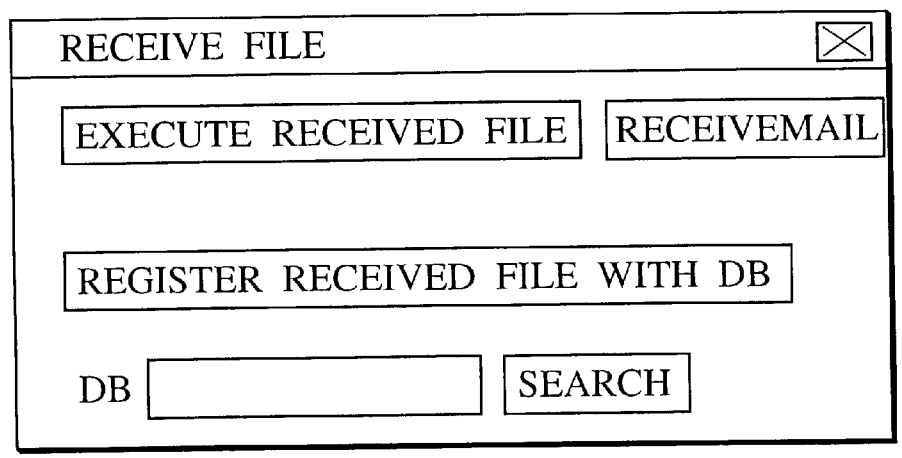
FIG. 34B is a sample window of receiving file window according to a second example.

FIG. 34A and FIG. 34B is a sample window according to the second example. In this example, the sending system performs the transmission of a file. And the receiving system executes the received file. FIG. 34A is a sample window of sending file window according to the second example. First, the sending system prompts to input a file to be sent. The file includes document file, executable file, a file for registering database, and the like. In creating the file which transmits newly, "create file" button will be clicked. Then, an application, such as an editor, is executed. An operator describes a program or a script to be sent. When file transmission is ready, a "send mail" button is clicked. Then, a mail is transmitted to the addressee via Internet with the mail interface.

FIG. 34B is a sample window of receiving file window according to the second example. First, a "receive mail" button is clicked. Then, the mail transmitted from the sending system is dispayed. An "execute recieved file" button is clicked when the received file type is executable. Then, a recieved file is executed. Moreover, if the file for the transmitted file is registered with DB, the "register recieved file with DB" button is clicked. Then, the file is registered with a specified DB.

Thus in order to perform communications between applications under border-less network environment, in this case of the operation, the Internet mail is used as a transmission way of data or a process, and communications between applications under unspecified network environment is enabled.

Thereby, in a different company, even if it is in the case of different server, a language, and a protocol, communications between applications can be performed flexibly.

COMPUTER PROGRAM PRODUCT

A program that realizes the information processing and communications between applications as described above may be stored on a recording medium. The program stored in the recording medium is read into a computer system, so that the above-described information processing and communications between application systems can be realized by executing the program while controlling the computer. The recording medium includes such devices as a memory device, magnetic disk device, and an optical disk device, that are able to record the program. For example, the recording medium could be CD-ROM, DVD, ZIP, JAZ, MO, DAT, or the like.

Figure 35:
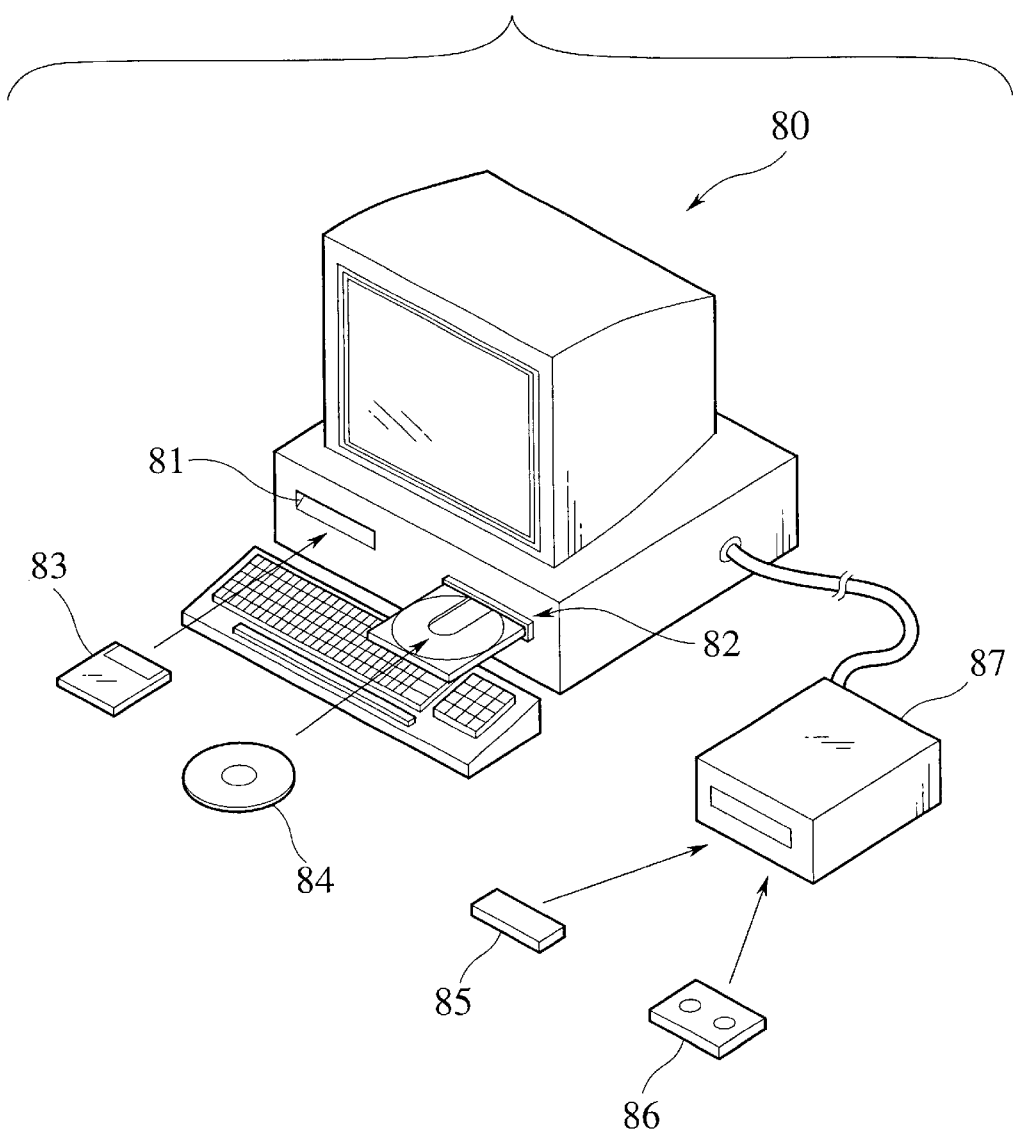
FIG. 35 shows an example of computer system that reads a computer program product.

FIG. 35 schematically shows one example of a computer system that reads a program stored in the recording medium, and performs production scheduling management according to the procedure described in the program. The computer system 80 is provided, at a front face of its main body, with a floppy disk drive 81, and CD-ROM or DVD drive 82. A drive device 87 is connected to a computer system 80. The drive device permits reading and writing of a recording medium, such as ZIP, JAZ, MO or DAT. A floppy disk 83 as a magnetic disk device, or CD-ROM or DVD 84 as an optical disk device, is inserted into each drive through a slot, and a certain reading operation is performed, so that the program stored in the recording medium can be installed in the computer system. Similarly, each type of medium 85, 86 may be inserted into a slot of a drive device 87, and a certain reading operation may be performed. In this manner, the information processing and communications between applications can be performed by the computer system.

The entire content of Japanese foreign application Heisei 9 tokugan 341654 and Heisei 10 tokugan 180816 are hereby incorporated by reference.

The invention may be embodied in other specific forms without departing from the spirit or essential characteristics thereof. The present embodiments are therefore to be considered in all respects as illustrative and not restrictive, the scope of the invention is indicated by the appended claims rather than by the foregoing description, and all changes which come with the meaning and range of equivalency of the claims are therefore intended to be embraced therein.

What is claimed is:

1. An information processing system, comprising:
 a batch control class configured to pass a beginning message to an input class, the batch control class configured to schedule a next class after receiving a completion message;
 the input class configured to receive the beginning message from the batch control class to start input processing, the input class configured to input data to process, the input processing specified to incorporate at least one parameter as an instance value into the input class, the parameter defining a behavior of the input class, the input class configured to pass the completion message to the batch control class upon completion of the input processing;
 a conversion class configured to receive a beginning message from the batch control class to start conversion processing, the conversion class configured to input the data processed by the input class, the conversion processing specified to incorporate at least one parameter as an instance value into the conversion class, the parameter defining a behavior of the conversion class, the conversion class configured to pass the completion message to the batch control class upon completion of the conversion processing; and
 an output class configured to receive a beginning message from the batch control class to start output processing, the output class configured to input data processed by the conversion class, the output class configured to prepare output data, the output processing specified to incorporate at least one parameter as an instance value into the output class.

2. An information processing system for preparing a program using a class, comprising:
 a parameter definition unit configured to define at least one parameter as a behavior of each class to input the parameter; and
 a program generation unit configured to generate a program including:
  a batch control class configured to pass a beginning message to an input class, the batch control class configured to schedule a next class after receiving a completion message;
  the input class configured to receive the beginning message from the batch control class to start input processing, the input class configured to input data to process, the input processing specified to incorporate at least one parameter as an instance value into the input class, the parameter defining a behavior of the input class, the input class configured to pass the completion message to the batch control class upon completion of the input processing;
  a conversion class configured to receive a beginning message from the batch control class to start conversion processing, the conversion class configured to input the data processed by the input class, the conversion processing specified to incorporate at least one parameter as an instance value into the conversion class, the parameter defining a behavior of the conversion class, the conversion class configured to pass the completion message to the batch control class upon completion of the conversion processing; and an output class configured to receive a beginning message from the batch control class to start output processing, the output class configured to input data processed by the conversion class, the output class configured to prepare output data, the output processing specified to incorporate at least one parameter as an instance value into the output class.

3. The system according to claim 2, wherein the parameter definition unit receives a class from a class library and defines at least one parameter as the behavior of each class, and incorporates the parameter into the class.

4. The system according to claim 2, wherein the parameter definition unit prompts to input at least one parameter using a wizard.

5. The system according to claim 2, wherein the input class includes at least one of:

a sort input method for inputting a file with sorting;

a merge input method for inputting a file with merging;

a matching input method for inputting a file with matching;

a database input method for inputting from a database; and a file input method for inputting from a file.

6. The system according to claim 2, wherein the conversion class includes at least one of:

a sort method for sorting data in a file;

a format method for converting a format of data in a file;

a replace method for replacing data in a file;

an expansion method for expanding data in a file;

a matching method for matching data in files;

a summary method for summarizing data in a file; and a consistency check method for checking whether or not data in a file have consistency.

7. The system according to claim 2, wherein the output class includes at least one of:

a text file output method for outputting a file as a text file;

a CSV file output method for outputting a file as a CSV file;

an import form file output for outputting a file as an import form file;

a mail method for sending a file to at least one e-mail account;

a list output method for outputting a file as a list form;

a database output method for outputting a file as a database; and a certification output method for outputting a file as a certification form.

8. An information processing method using a class, comprising the steps of:

(A) passing a first beginning message to start an input class;

(B) performing an input process to prepare an input file upon reception of a first beginning message, the input process specified to incorporate at least one parameter as an instance value into the input class, the parameter defining a behavior of the input class, and outputting a first completion message upon completion;

(C) passing a second beginning message upon reception of the first completion message;

(D) performing a conversion process to convert the input file into a conversion-work upon reception of the second beginning message, the conversion process specified to incorporate at least one parameter as an instance value into a conversion class, the parameter defining a behavior of the conversion class, and outputting a second completion message upon completion;

(E) passing a third beginning message upon reception of the second completion message, and outputting a third completion message upon completion; and (F) performing an output process to output the conversion-work upon reception of the third beginning message, the output process specified to incorporate at least one parameter as an instance value into the output class, the parameter defining a behavior of the output class, and outputting a third completion message upon completion.

9. The method according to claim 8, further comprising the steps of:

receiving a class from a class library;

defining at least one parameter as a behavior of each class; and incorporating the at least one parameter into the class.

10. The method according to claim 8, further comprising the step of:

prompting an operator, by way of a wizard, to input at least one parameter.

11. A computer product for information processing using a class, comprising the steps of:

(A) passing a first beginning message to start an input class;

(B) performing an input process to prepare an input file upon reception of a first beginning message, the input process specified to incorporate at least one parameter as an instance value into the input class, the parameter defining a behavior of the input class, and outputting a first completion message upon completion;

(C) passing a second beginning message upon reception of the first completion message;

(D) performing a conversion process to convert the input file into a conversion-work upon reception of the second beginning message, the conversion process specified to incorporate at least one parameter as an instance value into a conversion class, the parameter defining a behavior of the conversion class, and outputting a second completion message upon completion;

(E) passing a third beginning message upon reception of the second completion message, and outputting a third completion message upon completion; and (F) performing an output process to output the conversion-work upon reception of the third beginning message, the output process specified to incorporate at least one parameter as an instance value into the output class, the parameter defining a behavior of the output class, and outputting a third completion message upon completion.

* * * * *